(12) United States Patent
Wang et al.

(10) Patent No.: US 11,184,860 B2
(45) Date of Patent: Nov. 23, 2021

(54) DATA SENDING METHOD AND APPARATUS

(71) Applicant: Huawei Technologies Co., Ltd., Shenzhen (CN)

(72) Inventors: Hong Wang, Beijing (CN); Wei Quan, Beijing (CN); Jian Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 143 days.

(21) Appl. No.: 16/368,541

(22) Filed: Mar. 28, 2019

(65) Prior Publication Data
US 2019/0223109 A1    Jul. 18, 2019

Related U.S. Application Data

(63) Continuation of application No. PCT/CN2016/100949, filed on Sep. 29, 2016.

(51) Int. Cl.
| H04W 52/14 | (2009.01) |
| H04W 52/28 | (2009.01) |
| H04W 52/48 | (2009.01) |
| H04W 52/24 | (2009.01) |
| H04W 52/38 | (2009.01) |
| H04W 52/26 | (2009.01) |
| H04W 72/04 | (2009.01) |
| H04W 72/08 | (2009.01) |

(52) U.S. Cl.
CPC ......... *H04W 52/146* (2013.01); *H04W 52/24* (2013.01); *H04W 52/245* (2013.01);
(Continued)

(58) Field of Classification Search
CPC ........... H04W 28/0268; H04W 72/042; H04W 76/15; H04W 76/27; H04W 28/24;
(Continued)

(56) References Cited

U.S. PATENT DOCUMENTS

| 5,930,684 A | 7/1999 | Keskitalo et al. |
| 2009/0082057 A1* | 3/2009 | Hwang ............... H04W 52/242 455/522 |

(Continued)

FOREIGN PATENT DOCUMENTS

| CN | 1938969 A | 3/2007 |
| CN | 101394208 A | 3/2009 |

(Continued)

OTHER PUBLICATIONS

Samsung, "Discussion on Study Areas for URLLC in 5G New Radio Interface", 3GPP TSG RAN WG2 #93bis, Dubrovnik, Croatia, R2-162227, 4 pages (Apr. 11-15, 2016).

*Primary Examiner* — Ajibola A Akinyemi
(74) *Attorney, Agent, or Firm* — Leydig, Voit & Mayer, Ltd.

(57) ABSTRACT

A data sending method and an apparatus are provided to reduce a quantity of UEs that retransmit data, and to reduce an entire data sending latency. The method includes: sending, by a base station, power configuration information to a terminal, where the power configuration information includes a one-to-one correspondence between power information and terminal status information, and the power configuration information is used to enable the terminal to obtain transmit power used to send data; and receiving, by the base station, data sent by the terminal, where the transmit power of the data is determined by the terminal based on the power configuration information; the terminal status information includes at least one of a service type of the data sent by the terminal, a priority of the data sent by the terminal, and information about measurement of a radio environment by the terminal.

16 Claims, 17 Drawing Sheets

(52) U.S. Cl.
CPC ....... *H04W 52/265* (2013.01); *H04W 52/281* (2013.01); *H04W 52/383* (2013.01); *H04W 52/48* (2013.01); *H04W 72/042* (2013.01); *H04W 72/044* (2013.01); *H04W 72/085* (2013.01); *H04W 52/242* (2013.01)

(58) Field of Classification Search
CPC ....... H04W 36/14; H04W 4/40; H04W 92/18; H04W 36/0058; H04W 72/14; H04W 88/06; H04W 12/08; H04W 36/08; H04W 36/30; H04W 76/11; H04W 76/12; H04W 24/10; H04W 36/0055; H04W 4/06; H04W 52/146
USPC .......................................................... 455/522
See application file for complete search history.

(56) References Cited

U.S. PATENT DOCUMENTS

| | | | |
|---|---|---|---|
| 2009/0201884 A1* | 8/2009 | Chaponniere | H04W 92/20 370/332 |
| 2010/0202420 A1* | 8/2010 | Jersenius | H04L 47/10 370/337 |
| 2012/0289278 A1 | 11/2012 | Huschke et al. | |
| 2014/0126530 A1 | 5/2014 | Siomina et al. | |
| 2015/0085833 A1* | 3/2015 | Han | H04L 5/001 370/336 |
| 2015/0181618 A1 | 6/2015 | Yang et al. | |
| 2016/0037530 A1 | 2/2016 | Peng et al. | |
| 2016/0249297 A1* | 8/2016 | Oh | H04W 52/143 |
| 2017/0048807 A1 | 2/2017 | Wang | |
| 2018/0167960 A1 | 6/2018 | Zhang et al. | |

FOREIGN PATENT DOCUMENTS

| | | |
|---|---|---|
| CN | 101926198 A | 12/2010 |
| CN | 102740421 A | 10/2012 |
| CN | 104105185 A | 10/2014 |
| CN | 104509180 A | 4/2015 |
| CN | 105050189 A | 11/2015 |
| CN | 105659672 A | 6/2016 |
| EP | 3002976 A1 | 4/2016 |
| WO | 2011035621 A1 | 3/2011 |
| WO | 2015013854 A1 | 2/2015 |

* cited by examiner

DATA SENDING METHOD AND APPARATUS

CROSS-REFERENCE TO RELATED APPLICATIONS

This application is a continuation of International Application No. PCT/CN2016/100949, filed on Sep. 29, 2016, the disclosure of which is hereby incorporated by reference in its entirety.

TECHNICAL FIELD

Embodiments of the present invention relate to the communications field, and in particular, to a data sending method and an apparatus.

BACKGROUND

In a communications system, a latency may be defined as one-trip time (OTT), and is a time from sending data by a transmit end to receiving data by a receive end; or may be defined as a round trip time (RTT), and is a time from sending data by a transmit end to receiving feedback information by the transmit end. In addition, the latency may be further divided into a control plane latency and a user plane latency. The control plane latency is a time for switching an idle mode to a connected mode of user equipment, and it is generally required that the control plane latency is not greater than 10 ms in a 5th Generation (5G) mobile communications technology system. The user plane latency is a time from entering a service data unit (SDU) at a layer 2 or a layer 3 of a radio protocol layer by data or a message of a user application layer to decoding the data or the message at a corresponding layer. As shown in FIG. 1, for example, user equipment (UE) sends data to a base station (Evolved NodeB, eNB). The user plane latency is a time from entering a PDCP layer by a UE side Packet Data Convergence Protocol service data unit (PDCP SDU) to leaving the PDCP layer by a base station side PDCP SDU, and it is generally required that the user plane latency is not greater than 0.5 ms in the 5th Generation mobile communications technology system.

In the prior art, for the user plane latency, to meet an ultra-low latency, a resource contention-based uplink data sending method is proposed. As shown in FIG. 2A, a base station first allocates a plurality of common uplink resources to UE within a signal coverage area of the base station. When UE generates data and needs to send the data to the base station, the UE may directly send the data by using the uplink resources allocated by the base station, so as to reduce a latency in a process in which the UE requests a resource and then obtains a corresponding resource. However, a resource conflict occurs when a plurality of UEs send data by using a same uplink resource. Specifically, in a possible case, as shown in (a) in FIG. 2A, UE 1 selects a resource from allocated uplink resources to send uplink data. This uplink resource is used by only the UE 1, and in this case, no resource conflict occurs. In another possible case, as shown in (b) in FIG. 2B, UE 1 and UE 2 select a same resource from allocated uplink resources to send uplink data. This uplink resource is simultaneously used by the two UEs, and in this case, a resource conflict occurs. The base station may not successfully receive data sent by the UE 1 and the UE 2, and consequently the UE 1 and the UE 2 need to resend data, and a latency of sending the uplink data by the UE 1 and the UE 2 to the base station increases.

SUMMARY

The present invention provides a data sending method and an apparatus, so as to reduce a quantity of terminals that retransmit data, and reduce an entire data sending latency According to an aspect, a data sending method is provided, including: sending, by a network device, power configuration information to a terminal, where the power configuration information includes a one-to-one correspondence between power information and terminal status information, and the power configuration information is used to enable the terminal to obtain transmit power used to send data; and receiving, by the network device, data sent by the terminal, where the transmit power of the data is determined by the terminal based on the power configuration information; the terminal status information includes at least one of a service type of the data sent by the terminal, a priority of the data sent by the terminal, and information about measurement of a radio environment by the terminal; and the power information includes at least one of expected receive power of the network device, transmit power used by the terminal to communicate with the network device, and transmit power used by the terminal to perform D2D communication. In this way, based on the correspondence, different power information is set for data of different service types, data of different priorities, or data corresponding to different radio environments, in other words, different terminals use the different power information when sending data. When a resource conflict occurs because a plurality of terminals send data based on resource contention, the network device or a terminal may receive, in different manners, data sent by the different terminals, so as to ensure a success rate of receiving data sent by some terminals, reduce a quantity of terminals that retransmit data, and reduce an entire data sending latency.

In a possible design, when the terminal status information includes the service type of the data sent by the terminal or the priority of the data sent by the terminal, the method further includes: receiving, by the network device, the service type of the data or the priority of the data sent by the terminal within a coverage area of the network device; or receiving, by the network device, quality of service QoS information that is sent by a core network and that is corresponding to different service types, so as to determine the service type of the data or the priority of the data based on the QoS information. That is, the data service type or the data priority obtained by the network device may be sent by the terminal, or may be sent by the core network. In addition, different power information may be determined for data of different service types or data of different priorities by associating with the data service type or the data priority, so that transmission efficiency of some data or QoS of some services can be ensured.

In a possible design, the method further includes: sending, by the network device, a resource configuration message to the terminal, where the resource configuration message includes a reference signal received power RSRP range of the terminal and a time-frequency resource configuration parameter, or the resource configuration message includes a reference signal received quality RSRQ range of the terminal and a time-frequency resource configuration parameter, and the time-frequency resource configuration parameter includes a physical resource block PRB parameter and a subframe parameter, or the time-frequency resource configuration parameter includes a PRB parameter and a system frame parameter. The resource configuration message may be used to configure different uplink resources for terminals in different radio environments. It is assumed that when two terminals in different radio environments send data, that is, when two terminals with different RSRP ranges send data, time-frequency resources determined by the two terminals are different, so as to avoid a conflict when the network device receives the data sent by the two terminals. Specifically, as shown in FIG. 2B, if a priority of a service type of a terminal 1 is high, corresponding transmit power is also high; and if a priority of a service type of a terminal 2 is low, and corresponding transmit power is also low. However, because a radio environment of the terminal 2 is better than a radio environment of the terminal 1, that is, an RSRP range of the terminal 2 is larger than an RSRP range of the terminal 1, a path loss of the terminal 1 is greater than a path loss of the terminal 2, so that receive power used when data sent by the terminal 2 reaches the network device may be the same as receive power used when data sent by the terminal 1 reaches the network device. Although transmit power of the terminal 1 is different from the transmit power of the terminal 2, the network device cannot receive the data of the two terminals having same receive power when the data reaches the network device. However, if different time-frequency resources are configured for the two terminals in different radio environments, a problem that the network device cannot receive the data sent by the terminal 1 and the terminal 2 when a resource conflict occurs can be avoided. In this way, a case in which the network device or a peer end cannot successfully receive some data because power used when data with relatively high transmit power reaches the network device or the peer end is the same as power used when data with relatively low transmit power reaches the network device or the peer end is avoided.

In a possible design, the power configuration information further includes an amplitude value, the amplitude value is used to enable the terminal to determine transmit power used to retransmit the data, and the transmit power used to retransmit the data is a sum of transmit power used for last data sending and the amplitude value. In this way, the transmit power used by the terminal to retransmit the data is larger, and the data is more likely to be successfully transmitted, so as to reduce a retransmission latency.

According to another aspect, a data sending method is provided, including: receiving, by a terminal, power configuration information sent by a network device, where the power configuration information includes a one-to-one correspondence between power information and terminal status information; and determining, by the terminal based on the power configuration information, transmit power used by the terminal to send data; the terminal status information includes at least one of a service type of the data sent by the terminal, a priority of the data sent by the terminal, and information about measurement of a radio environment by the terminal; and the power information includes at least one of expected receive power of the network device, transmit power used by the terminal to communicate with the network device, and transmit power used by the terminal to perform D2D communication. In this way, based on the correspondence, different power information is set for data corresponding to different service types, data corresponding to different priorities, or data corresponding to different radio environments, in other words, different terminals use the different power information when sending data. When a resource conflict occurs because a plurality of terminals send data based on resource contention, the network device or a peer end may receive data sent by some terminals, so as to ensure a success rate of receiving some data, reduce a quantity of terminals that retransmit data, and reduce an entire data sending latency.

In a possible design, when the terminal status information includes the service type of the data or the priority of the data sent by the terminal, and the power information includes the expected receive power of the network device, the determining, by the terminal based on the power configuration information, transmit power used by the terminal to send data includes: determining, by the terminal based on expected receive power of the network device corresponding to the service type of the data sent by the terminal or expected receive power of the network device corresponding to the priority of the data sent by the terminal, expected receive power of the network device to which the data is sent; and determining, by the terminal based on the expected receive power of the network device to which the data is sent and a path loss value, the transmit power used by the terminal to send the data; or when the terminal status information includes the service type of the data sent by the terminal or the priority of the data sent by the terminal, and the power information includes the transmit power of the terminal used by the terminal to communicate with the network device, the determining, by the terminal based on the power configuration information, transmit power used by the terminal to send data includes: determining, by the terminal based on transmit power of the terminal corresponding to the service type of the data sent by the terminal or transmit power of the terminal corresponding to the priority of the data sent by the terminal, the transmit power used by the terminal to send the data.

In a possible design, when the terminal status information includes the information about measurement of the radio environment by the terminal, the measurement information includes reference signal received power RSRP or reference signal received quality RSRQ of the network device measured by the terminal, and the power information includes the expected receive power of the network device, the determining, by the terminal based on the power configuration information, transmit power used by the terminal to send data includes: determining, by the terminal based on expected receive power of the network device corresponding to the measurement information of the radio environment, expected receive power of the network device to which the data is sent; and determining, by the terminal based on the expected receive power of the network device to which the data is sent and a path loss value, the transmit power used by the terminal to send the data; or when the terminal status information includes the information about measurement of the radio environment by the terminal, the measurement information includes reference signal received power RSRP or reference signal received quality RSRQ of the network device measured by the terminal, and the power information includes the transmit power of the terminal used by the terminal to communicate with the network device, the determining, by the terminal based on the power configuration information, transmit power used by the terminal to send data includes: determining, by the terminal, transmit power of the terminal corresponding to the information about measurement of the radio environment by the terminal as the transmit power used by the terminal to send the data.

In a possible design, when the power information includes the transmit power used by the terminal to perform D2D communication, and the terminal status information includes the service type of the data sent by the terminal, the priority of the data sent by the terminal, or the information about measurement of the radio environment by the terminal, the information about measurement of the radio environment by the terminal includes RSRP or RSRQ that is measured by the terminal and that is of a reference signal sent by a peer end, the terminal performs D2D communication with the peer end, and the determining, by the terminal based on the power configuration information, transmit power used by the terminal to send data includes: determining, by the terminal as the transmit power used by the terminal to send the data, transmit power that is used by the terminal to perform D2D communication and that is corresponding to the service type, transmit power that is used by the terminal to perform D2D communication and that is corresponding to the data priority, or transmit power that is used by the terminal to perform D2D communication and that is corresponding to the information about measurement of the radio environment by the terminal. In this way, when sending data corresponding to different service types or data corresponding to different priorities, the terminal may use different transmit power. It is ensured that when a resource conflict occurs, in D2D communication, the terminal that receives the data may receive data sent by some terminals that sends the data, and a quantity of terminals that retransmit data is reduced.

In a possible design, the method further includes: receiving, by the terminal, a resource configuration message sent by the network device, where the resource configuration message includes a reference signal received power RSRP range of the terminal and a time-frequency resource configuration parameter, or the resource configuration message includes a reference signal received quality RSRQ range of the terminal and a time-frequency resource configuration parameter, and the time-frequency resource configuration parameter includes a physical resource block PRB parameter and a subframe parameter, or the time-frequency resource configuration parameter includes a PRB parameter and a system frame parameter; and determining, by the terminal based on the resource configuration message, an uplink resource used by the terminal to send the data. The resource configuration message may be used to configure different uplink resources for terminals in different radio environments. It is assumed that when two terminals in different radio environments send data, that is, when two terminals with different RSRP ranges send data, time-frequency resources determined by the two terminals are different, so as to avoid a conflict when the network device receives the data sent by the two terminals.

In a possible design, the method further includes: sending, by the terminal to the network device, the service type of the data sent by the terminal or the priority of the data sent by the terminal.

In a possible design, the method further includes: if the terminal determines that the network device does not receive the data, or if the terminal determines that the peer end does not receive the data when D2D communication is performed, determining, by the terminal, transmit power used to retransmit the data, where the transmit power used to retransmit the data is a sum of transmit power used for last data sending and a preset amplitude value. In this way, the transmit power used by the terminal to retransmit the data is larger, and the data is more likely to be successfully transmitted, so as to reduce a retransmission latency.

According to another aspect, a network device is provided, including: a sending unit, configured to send power configuration information to a terminal, where the power configuration information includes a one-to-one correspondence between power information and terminal status information, and the power configuration information is used to enable the terminal to obtain transmit power used to send data; and a receiving unit, configured to receive data sent by the terminal, where the transmit power of the data is determined by the terminal based on the power configuration information; the terminal status information includes at least one of a service type of the data sent by the terminal, a priority of the data sent by the terminal, and information about measurement of a radio environment by the terminal; and the power information includes at least one of expected receive power of the network device, transmit power used by the terminal to communicate with the network device, and transmit power used by the terminal to perform D2D communication.

In a possible design, when the terminal status information includes the service type of the data sent by the terminal or the priority of the data sent by the terminal, the receiving unit is further configured to: receive the service type of the data or the priority of the data sent by the terminal; or receive quality of service QoS information sent by a core network, so as to determine the service type of the data or the priority of the data based on the QoS information.

In a possible design, before the network device receives the data sent by the terminal, the sending unit is further configured to: send a resource configuration message to the terminal, where the resource configuration message includes a reference signal received power RSRP range of the terminal and a time-frequency resource configuration parameter, or the resource configuration message includes a reference signal received quality RSRQ range of the terminal and a time-frequency resource configuration parameter, and the time-frequency resource configuration parameter includes a physical resource block PRB parameter and a subframe parameter, or the time-frequency resource configuration parameter includes a PRB parameter and a system frame parameter.

In a possible design, the power configuration information further includes an amplitude value, the amplitude value is used to enable the terminal to determine transmit power used to retransmit the data, and the transmit power used to retransmit the data is a sum of transmit power used for last data sending and the amplitude value.

According to still another aspect, a terminal is provided, including: a receiving unit, configured to receive power configuration information sent by a network device, where the power configuration information includes a one-to-one correspondence between power information and terminal status information; and a determining unit, configured to determine, based on the power configuration information, transmit power used by the terminal to send data. The terminal status information includes at least one of a service type of the data sent by the terminal, a priority of the data sent by the terminal, and information about measurement of a radio environment by the terminal; and the power information includes at least one of expected receive power of the network device, transmit power used by the terminal to communicate with the network device, and transmit power used by the terminal to perform D2D communication.

In a possible design, when the terminal status information includes the service type of the data or the priority of the data sent by the terminal, and the power information includes the expected receive power of the network device, the determining unit is configured to: determine, based on expected receive power of the network device corresponding to the service type of the data sent by the terminal or expected receive power of the network device corresponding to the priority of the data sent by the terminal, expected receive power of the network device to which the data is sent; and determine, based on the expected receive power of the network device to which the data is sent and a path loss value, the transmit power used by the terminal to send the data; or when the terminal status information includes the service type of the data sent by the terminal or the priority of the data sent by the terminal, and the power information includes the transmit power of the terminal used by the terminal to communicate with the network device, the determining unit is configured to: determine, based on transmit power of the terminal corresponding to the service type of the data sent by the terminal or transmit power the terminal corresponding to the priority of the data sent by the terminal, the transmit power used by the terminal to send the data.

In a possible design, when the terminal status information includes the information about measurement of the radio environment by the terminal, the measurement information includes reference signal received power RSRP or reference signal received quality RSRQ of the network device measured by the terminal, and the power information includes the expected receive power of the network device, the determining unit is configured to: determine, based on expected receive power of the network device corresponding to the measurement information of the radio environment, expected receive power of the network device to which the data is sent; and determine, based on the expected receive power of the network device to which the data is sent and a path loss value, the transmit power used by the terminal to send the data; or when the terminal status information includes the information about measurement of the radio environment by the terminal, the measurement information includes reference signal received power RSRP or reference signal received quality RSRQ of the network device measured by the terminal, and the power information includes the transmit power of the terminal used by the terminal to communicate with the network device, the determining unit is configured to: determine transmit power of the terminal corresponding to the information about measurement of the radio environment by the terminal as the transmit power used by the terminal to send the data.

In a possible design, when the power information includes the transmit power used by the terminal to perform D2D communication, and the terminal status information includes the service type of the data sent by the terminal, the priority of the data sent by the terminal, or the information about measurement of the radio environment by the terminal, the information about measurement of the radio environment by the terminal includes RSRP or RSRQ that is measured by the terminal and that is of a reference signal sent by a peer end, and the determining unit is configured to: determine, as the transmit power used by the terminal to send the data, transmit power that is used by the terminal to perform D2D communication and that is corresponding to the service type of the data sent by the terminal, transmit power that is used by the terminal to perform D2D communication and that is corresponding to the priority of the data sent by the terminal, or transmit power that is used by the terminal to perform D2D communication and that is corresponding to the information about measurement of the radio environment by the terminal.

In a possible design, the receiving unit is further configured to: receive a resource configuration message sent by the network device, where the resource configuration message includes a reference signal received power RSRP range of the terminal and a time-frequency resource configuration parameter, or the resource configuration message includes a reference signal received quality RSRQ range of the terminal and a time-frequency resource configuration parameter, and the time-frequency resource configuration parameter includes a physical resource block PRB parameter and a subframe parameter, or the time-frequency resource configuration parameter includes a PRB parameter and a system frame parameter; and determine, based on the resource configuration message, an uplink resource used by the terminal to send the data.

In a possible design, the terminal further includes a sending unit, configured to: send, to the network device, the service type of the data sent by the terminal or the priority of the data sent by the terminal.

In a possible design, the determining unit is further configured to: if it is determined that the network device does not receive the data, or if it is determined that the peer end does not receive the data when the terminal performs D2D communication, determine transmit power used to retransmit the data, where the transmit power used to retransmit the data is a sum of transmit power used for last data sending and a preset amplitude value.

According to yet another aspect, an embodiment of the present invention further provides a communications system, and the communications system includes a network device and at least two terminals. For a specific implementation of the network device and the terminal, refer to the foregoing description.

According to yet another aspect, an embodiment of the present invention provides a computer storage medium, configured to store a computer software instruction used by the network device, and the computer storage medium includes a program designed for performing the foregoing aspects.

According to yet another aspect, an embodiment of the present invention provides a computer storage medium, configured to store a computer software instruction used by the terminal, including a program designed for performing the foregoing aspects.

In this way, when the plurality of terminals in the present invention simultaneously send data on a same uplink resource or a same communication resource by using different transmit power based on different service types or different priorities of the data that needs to be sent, or the plurality of terminals simultaneously send data on a same uplink resource or a same communication resource by using different transmit power based on radio environments in which the terminals are located, a prior-art case in which when a conflict occurs, the network device may not successfully receive the data sent by the plurality of terminals on the uplink resource or the communication resource is avoided. Further, according to the present invention, based on the correspondence, different power information is set for data corresponding to different service types, data corresponding to different priorities, or data corresponding to different radio environments, and when a resource conflict occurs because the plurality of terminals send data based on resource contention, data sent by some terminals can be received, so as to ensure a success rate of receiving some data, reduce a quantity of terminals that retransmit data, and reduce an entire data sending latency.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may be applied to a radio access technology (RAT) of 5G and may be applied to the following application scenarios: enhanced Machine Type Communication (eMTC), and ultra-reliable and low latency communications (URLLC). The embodiments of the present invention may be applied to a resource contention-based data sending process in the eMTC and the URLLC, or may be applied to another data sending process. This is not limited in this application.

Figure 1:
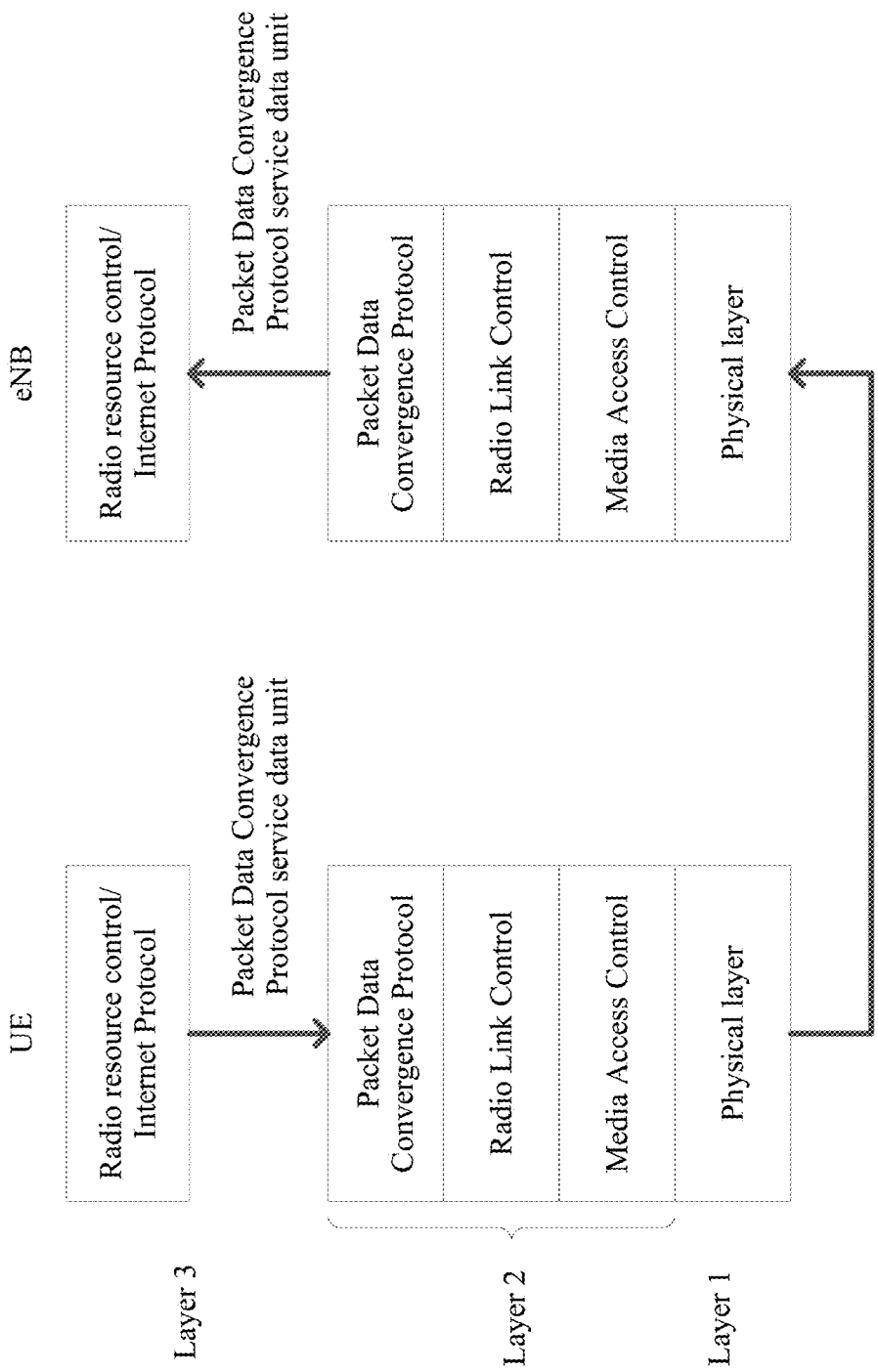
FIG. 1 is a schematic diagram of description of a user plane latency according to an embodiment of the present invention.
Figure 2A:
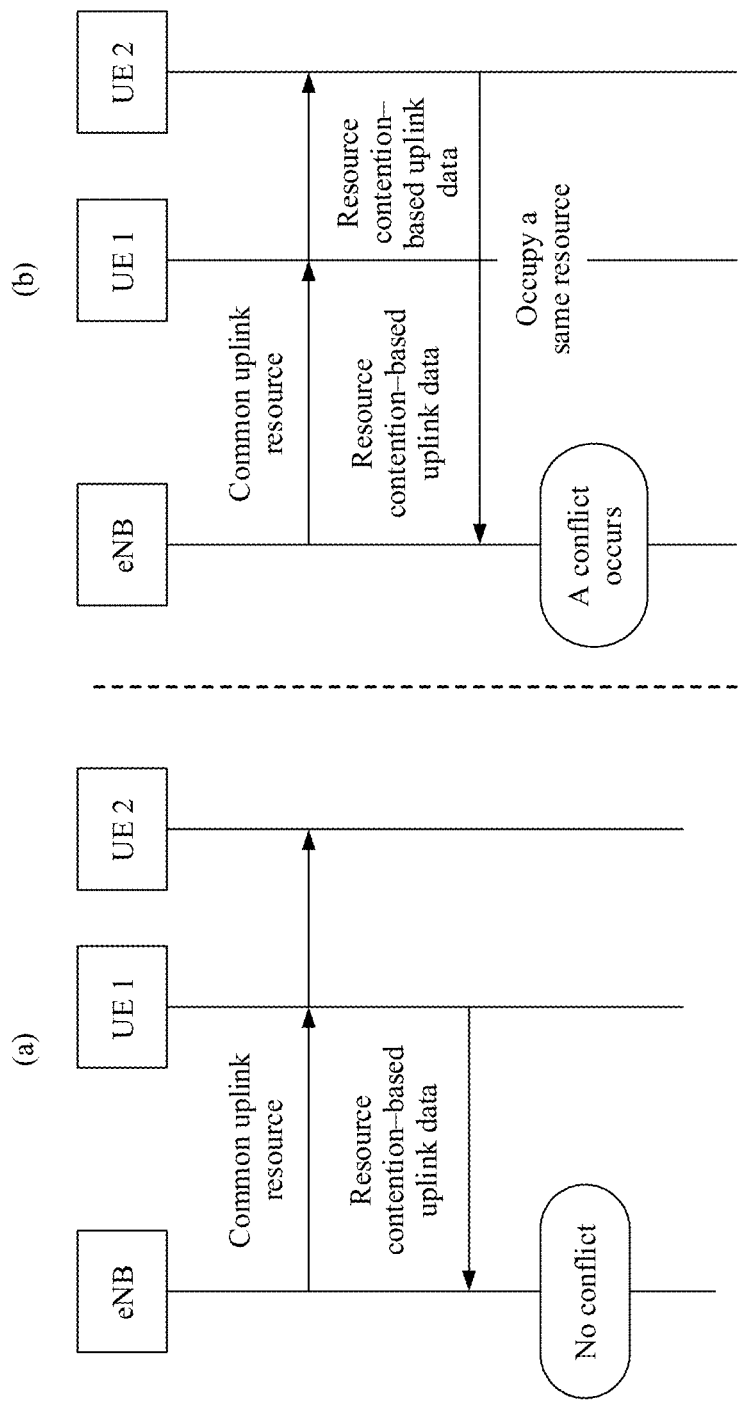
FIG. 2A is a schematic diagram of sending data based on resource contention according to an embodiment of the present invention.
Figure 2B:
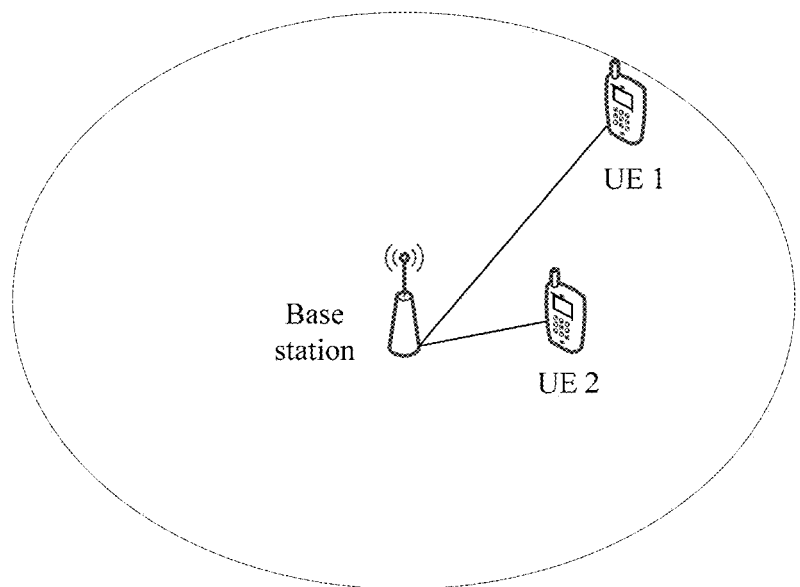
FIG. 2B is a scenario diagram of sending data by UE in different radio environments according to an embodiment of the present invention.
Figure 3:
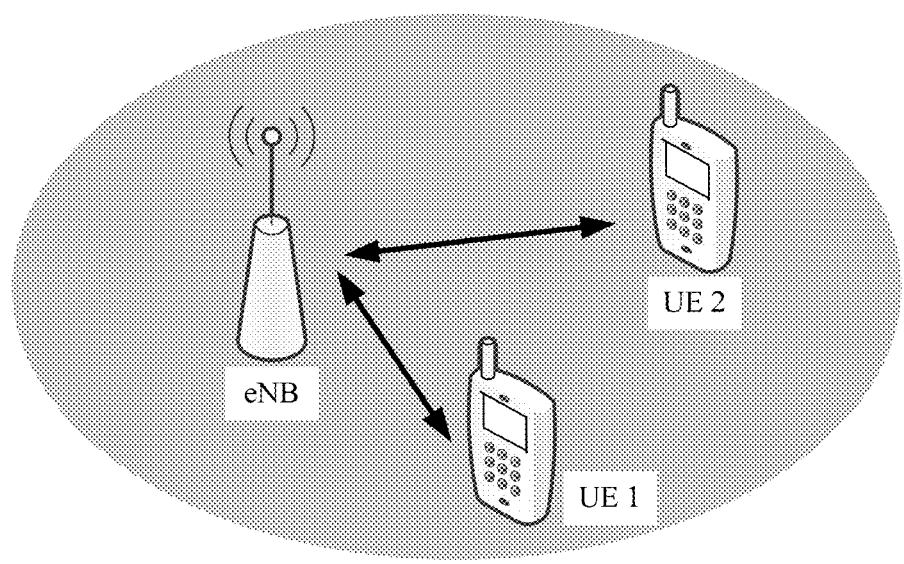
FIG. 3 is a scenario diagram of sending uplink data by UE according to an embodiment of the present invention.
Figure 4:
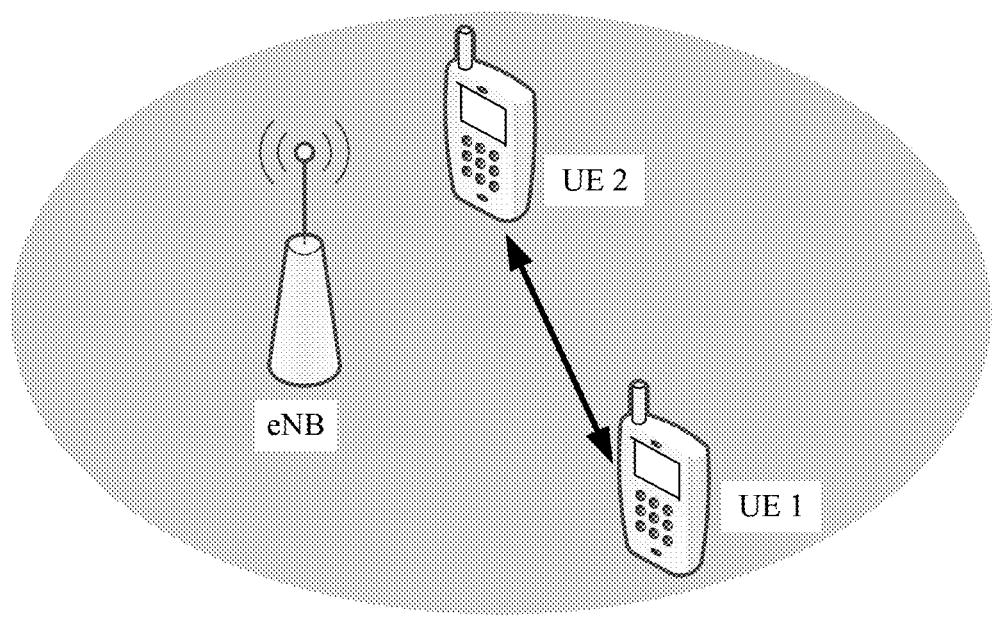
FIG. 4 is a scenario diagram of sending D2D data by UE according to an embodiment of the present invention.

A network architecture applied to the embodiments of the present invention may include a base station and a plurality of UEs within a coverage area of the base station. The base station may communicate with the UE, for example, the UE sends uplink data to the base station. As shown in FIG. 3, when the UE sends the uplink data in a resource contention-based uplink data sending process, the plurality of UEs may send the data to the base station by using a common uplink resource. Alternatively, the UEs may communicate with each other. As shown in FIG. 4, when different paired UEs send device-to-device (D2D) direct communication data in a resource contention-based data sending process, the UE that performs D2D communication may send the data by using a common resource.

In the embodiments of the present invention, a terminal may be user equipment UE, and the UE may be a mobile phone, an intelligent terminal, a multimedia device, a streaming media device, a wearable device, a smart meter, an intelligent water meter, or the like. In the embodiments of the present invention, a network device may be a base station, and the base station may be a bridge between UE and an evolved packet core (EPC) in Long Term Evolution (LTE). Base stations are connected to each other by using an X2 interface, and has main functions: radio resource management, Internet Protocol (IP) address header compression, and user data flow encryption, selecting of a mobility management entity (MME) when the UE is attached, routing of user plane data to a serving gateway (S-GW), paging message organization and sending, broadcast message organization and sending, measurement for mobility or scheduling, measurement report configuration, and the like.

Figure 5:
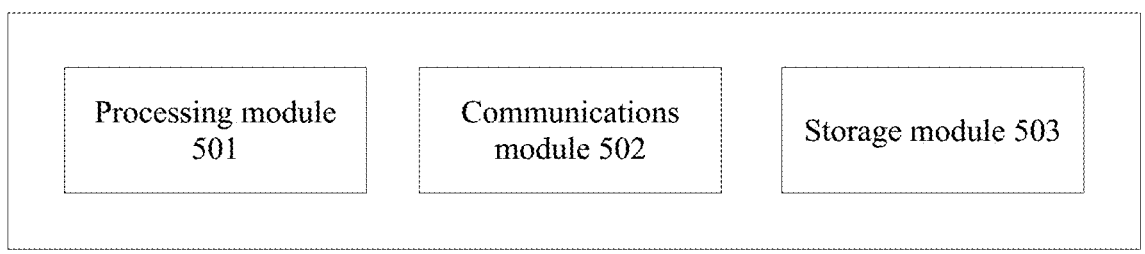
FIG. 5 is a schematic diagram of an internal structure of a base station according to an embodiment of the present invention.

FIG. 5 is a schematic diagram of an internal structure of a base station according to an embodiment of the present invention. In the present invention, the base station may include a processing module 501, a communications module 502, and a storage module 503. The processing module 501 is configured to control each hardware apparatus, application program software, and the like of the base station. The communications module 502 is configured to: receive, by using a communication manner such as LTE, 5G RAT, or Wi-Fi, an instruction sent by another device, and send data of the base station to the another device. The storage module 503 is configured to perform software program storage, data storage, software running, and the like of the base station.

Figure 6:
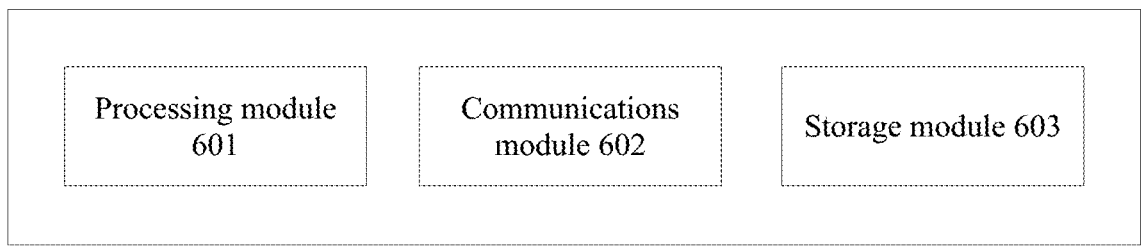
FIG. 6 is a schematic diagram of an internal structure of a terminal according to an embodiment of the present invention.

FIG. 6 is a schematic diagram of an internal structure of a terminal according to an embodiment of the present invention. In the present invention, the terminal may include a processing module 601, a communications module 602, and a storage module 603. The processing module 601 is configured to control each hardware apparatus, application program software, and the like of the terminal. The communications module 602 is configured to: receive, by using a communication manner such as LTE, 5G RAT, or Wi-Fi, an instruction sent by another device, and send data of the terminal to the another device. The storage module 603 is configured to perform software program storage, data storage, software running, and the like of the terminal.

The following describes the embodiments of the present invention by using an example in which the terminal is user equipment UE, and sends data based on resource contention. A basic idea of the present invention is as follows: A base station sends power configuration information to covered UE; and when the UE generates uplink data, the UE first determines a service type or a priority of the data, or determines a radio environment of the UE, and then configures, based on the power configuration information, corresponding transmit power for data that needs to be sent. In this way, when the UE determines an uplink resource or a communication resource and sends the data based on a resource configuration message allocated by the base station, if a plurality of UEs send data by using a same uplink resource or communication resource, the plurality of UEs may send data to the base station or a peer end at different determined transmit power. Therefore, it is ensured that the base station or the peer end may receive data from some UEs with high receive power. The peer end is the other terminal with which the terminal performs D2D communication. A success rate of receiving some UE data is ensured, so as to reduce a quantity of UEs that retransmit data, and reduce an entire data sending latency.

In this embodiment of the present invention, the base station distinguishes between UEs by configuring different transmit power, and may further distinguish between the UEs by configuring different modulation and coding schemes (MCS) or configuring different scrambling manners, so as to reduce a quantity of UEs that retransmit data, and reduce an entire data sending latency.

Figure 7:
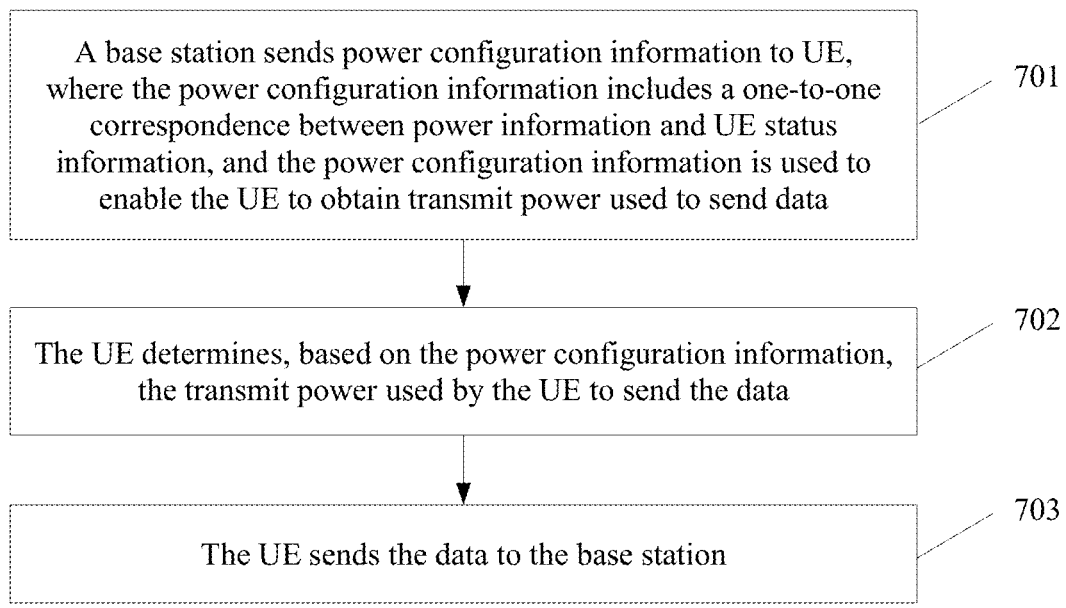
FIG. 7 is a schematic flowchart of a data sending method according to an embodiment of the present invention.

An embodiment of the present invention provides a data sending method. As shown in FIG. 7, the method includes the following steps.

701. A base station sends power configuration information to UE, where the power configuration information includes a one-to-one correspondence between power information and UE status information, and the power configuration information is used to enable the UE to obtain transmit power used to send data.

The UE status information includes at least one of a service type of the data sent by the UE, a priority of the data sent by the UE, and information about measurement of a radio environment by the UE.

The power information includes at least one of expected receive power of the base station, transmit power of the UE used by the UE to communicate with the base station, or transmit power used by the UE to perform D2D communication.

The service type of the data sent by the UE may include a voice service, a roaming service, an SMS service, an email service, a public security service, an Internet access service, and the like.

For example, if the base station configures that the expected receive power of the base station is corresponding to the priority of the data sent by the UE, the correspondence may be that relatively high expected receive power is configured for data of a high priority, and relatively low expected receive power is configured for data of a low priority. It is assumed that the priority of the data is represented by a number, and if the priority of the data is represented by a larger number, the priority is lower. For example, if a priority of data sent by UE 1 is 1, and a priority of data sent by UE 2 is 2, expected receive power configured for the UE 2 is lower than expected receive power configured for the UE 1.

If the base station configures that the expected receive power of the base station is corresponding to the service type of the data sent by the UE, the correspondence may be that different service types are corresponding to different expected receive power based on importance of the service types, a service type with high importance is corresponding to relatively high expected receive power, and a service type with low importance is corresponding to relatively low expected receive power. It is assumed that the service type of the data is represented by a number, and if the service type of the data is represented by a larger number, importance of the service type is lower. For example, if a service type of data sent by UE 1 is 1, and a service type of data sent by UE 2 is 2, expected receive power configured for the UE 2 is lower than expected receive power configured for the UE 1.

If the base station configures that the expected receive power of the base station is corresponding to the information about measurement of the radio environment by the UE, the correspondence may be a correspondence between the expected receive power of the base station and reference signal received power (RSRP) sent by the base station measured by the UE, and a larger RSRP value indicates larger expected receive power of the base station. Alternatively, if the base station configures that the expected receive power of the base station is corresponding to the information about measurement of the radio environment by the UE, the correspondence may be a correspondence between the expected receive power of the base station and reference signal received quality (RSRQ), and a larger RSRQ value indicates larger expected receive power of the base station. It is assumed that the RSRP or the RSRQ is in a unit of decibel-milliwatt dBm. If RSRP or RSRQ that is measured by UE 1 and that is of a reference signal sent by the base station is −100 dBm, and RSRP or RSRQ that is measured by the UE 2 and that is of a reference signal sent by the base station is −110 dBm, expected receive power configured for the UE 2 is lower than expected receive power configured for the UE 1.

If the transmit power of the UE used by the UE to communicate with the base station is corresponding to the priority of the data sent by the UE, the correspondence may be that relatively high transmit power is configured for data of a high priority, and relatively low transmit power is configured for data of a low priority. It is assumed that the priority of the data is represented by a number, and if the priority of the data is represented by a larger number, priority is lower. For example, if a priority of data sent by UE 1 is 4, and a priority of data sent by UE 2 is 7, transmit power configured for the UE 2 to communicate with the base station is lower than transmit power configured for the UE 1 to communicate with the base station.

If the transmit power used by the UE to communicate with the base station is corresponding to the service type of the data sent by the UE, the correspondence may be that different service types are corresponding to different transmit power based on importance of the service types, a service type with high importance is corresponding to relatively high transmit power, and a service type with low importance is corresponding to relatively low transmit power. It is assumed that the service type of the data sent by the UE is represented by a number, and if the service type of the data sent by the UE is represented by a larger number, importance of the service type is lower. For example, if a service type of data sent by UE 1 is 2, and a service type of data sent by UE 2 is 5, transmit power configured for the UE 2 to communicate with the base station is lower than transmit power configured for the UE 1 to communicate with the base station.

If the transmit power of the UE used by the UE to communicate with the base station is corresponding to the information about measurement of the radio environment by the UE, the correspondence may be a correspondence between the transmit power of the UE and RSRP of the base station measured by the UE, and a larger RSRP value indicates larger transmit power of the UE. Alternatively, if the transmit power of the UE is corresponding to the information about measurement of the radio environment by the UE, the correspondence may be a correspondence between the transmit power of the UE and RSRQ, and a larger RSRQ value indicates larger transmit power of the UE. It is assumed that the RSRP or the RSRQ is in a unit of decibel-milliwatt dBm. If RSRP or RSRQ that is measured by UE 1 and that is of a reference signal sent by the base station is −100 dBm, and RSRP or RSRQ that is measured by the UE 2 and that is of a reference signal sent by the base station is −110 dBm, transmit power configured for the UE 2 is lower than transmit power configured for the UE 1.

If the transmit power used by the UE to perform D2D communication is corresponding to a priority of D2D data, the correspondence may be that relatively high transmit power is configured for data of a high priority, and relatively low transmit power is configured for data of a low priority. It is assumed that the priority of the data is represented by a number, and if the priority of the data is represented by a larger number, the priority is lower. For example, if a priority of data sent by UE 1 is 4, and a priority of data sent by UE 2 is 7, transmit power configured for the UE 2 to perform D2D communication is lower than transmit power configured for the UE 1 to perform D2D communication.

If the transmit power used by the UE to perform D2D communication is corresponding to the service type of the data sent by the UE, the correspondence may be that different service types are corresponding to different transmit power based on importance of the service types, a service type with high importance is corresponding to relatively high transmit power, and a service type with low importance is corresponding to relatively low transmit power. It is assumed that the service type of the data is represented by a number, and if the service type of the data is represented by a larger number, importance of the service type is lower. For example, if a service type of data sent by UE 1 is 2, and a service type of data sent by UE 2 is 5, transmit power configured for the UE 2 to perform D2D communication is lower than transmit power configured for the UE 1 to perform D2D communication.

If the transmit power used by the UE to perform D2D communication is corresponding to the information about measurement of the radio environment by the UE, the correspondence may be a correspondence between the transmit power used by the UE to perform D2D communication and RSRP of peer UE measured by the UE, and a larger RSRP value indicates larger transmit power used by the UE to perform D2D communication. Alternatively, if a correspondence between the transmit power used by the UE to perform D2D communication and the information about measurement of the radio environment by the UE may be a correspondence between the transmit power used by the UE to perform D2D communication and RSRQ of peer UE, and a larger RSRQ value indicates larger transmit power used by the UE to perform D2D communication. It is assumed that the RSRP or the RSRQ is in a unit of decibel-milliwatt dBm. If RSRP or RSRQ that is measured by UE 1 and that is of a reference signal sent by the base station is −90 dBm, and RSRP or RSRQ that is measured by the UE 2 and that is of a reference signal sent by the base station is −100 dBm, transmit power configured for the UE 2 to perform D2D communication is lower than transmit power configured for the UE 1 to perform D2D communication.

702. The UE determines, based on the power configuration information, the transmit power used by the UE to send the data.

If the power configuration information includes a correspondence between any power information and any UE status information, the UE status information of the UE that needs to send the data may be first determined, and then power information that is used to send the data is determined based on the correspondence.

Specifically, if the power configuration information includes the correspondence between the expected receive power of the base station and the service type of the data sent by the UE, the UE first determines a service type of data that needs to be sent, and then determines, based on expected receive power of the base station corresponding to the service type of the data that needs to be sent, the transmit power used by the UE to send the data.

If the power configuration information includes the correspondence between the expected receive power of the base station and the priority of the data sent by the UE, the UE first determines a priority of data that needs to be sent, and then determines, based on expected receive power of the base station corresponding to the priority of the data that needs to be sent, the transmit power used by the UE to send the data.

If the power configuration information includes the correspondence between the expected receive power of the base station and the information about measurement of the radio environment by the UE, after determining the information about measurement of the radio environment by the UE, the UE may determine, based on expected receive power of the base station corresponding to the information about measurement of the radio environment by the UE, the transmit power used by the UE to send the data.

If the power configuration information includes the correspondence between the transmit power of the UE used by the UE to communicate with the base station and the service type of the data sent by the UE, the UE first determines a service type of data that needs to be sent, and then determines, based on transmit power of the UE corresponding to the service type of the data that needs to be sent, the transmit power used by the UE to send the data.

If the power configuration information includes the correspondence between the transmit power of the UE used by the UE to communicate with the base station and the priority of the data sent by the UE, the UE first determines a priority of data that needs to be sent, and then determines, based on transmit power of the UE corresponding to the priority of the data that needs to be sent, the transmit power used by the UE to send the data.

If the power configuration information includes the correspondence between the transmit power of the UE used by the UE to communicate with the base station and the information about measurement of the radio environment by the UE, after determining the information about measurement of the radio environment by the UE, the UE may determine, based on transmit power of the UE that is used by the UE to communicate with the base station and that is corresponding to the information about measurement of the radio environment by the UE, the transmit power used by the UE to send the data.

If the power configuration information includes the correspondence between the transmit power used by the UE to perform D2D communication and the service type, or includes the correspondence between the transmit power used by the UE to perform D2D communication and the priority of the data, after determining a service type of data that needs to be sent or a priority of data, the UE determines, based on the correspondence between a service type of the data that needs to be sent and the transmit power used by the UE to perform D2D communication or the correspondence between a priority of the data and the transmit power used by the UE to perform D2D communication, the transmit power used by the UE to send the data.

If the power configuration information includes the correspondence between the transmit power used by the UE to perform D2D communication and the measurement information of the radio environment, the UE first determines the measurement information of the radio environment, and then determines, based on transmit power of the UE that is used by the UE to communicate with the base station and that is corresponding to the information about measurement of the radio environment by the UE, the transmit power used by the UE to send the data.

703. The UE sends the data to the base station.

In this way, when a plurality of UEs send data on a same uplink resource or communication resource allocated by the base station, in other words, when a resource conflict occurs, the UE may determine, based on the correspondence, different transmit power for data corresponding to different service types; or the UE may determine, based on the correspondence, different transmit power for data corresponding to different priorities; or the UE may determine, based on the correspondence, different transmit power for data corresponding to different radio environments. Therefore, it can be ensured that data of a relatively high priority or data of a relatively important service type is successfully sent, or it can be ensured that data of UE in a relatively good radio environment is successfully sent, so as to reduce a quantity of UEs that retransmit the data, and reduce an entire data sending latency.

The following describes a case in which the UE sends the uplink data, and the power configuration information includes the correspondence between the expected receive power of the base station and the priority of the data sent by the UE.

Figure 8A:
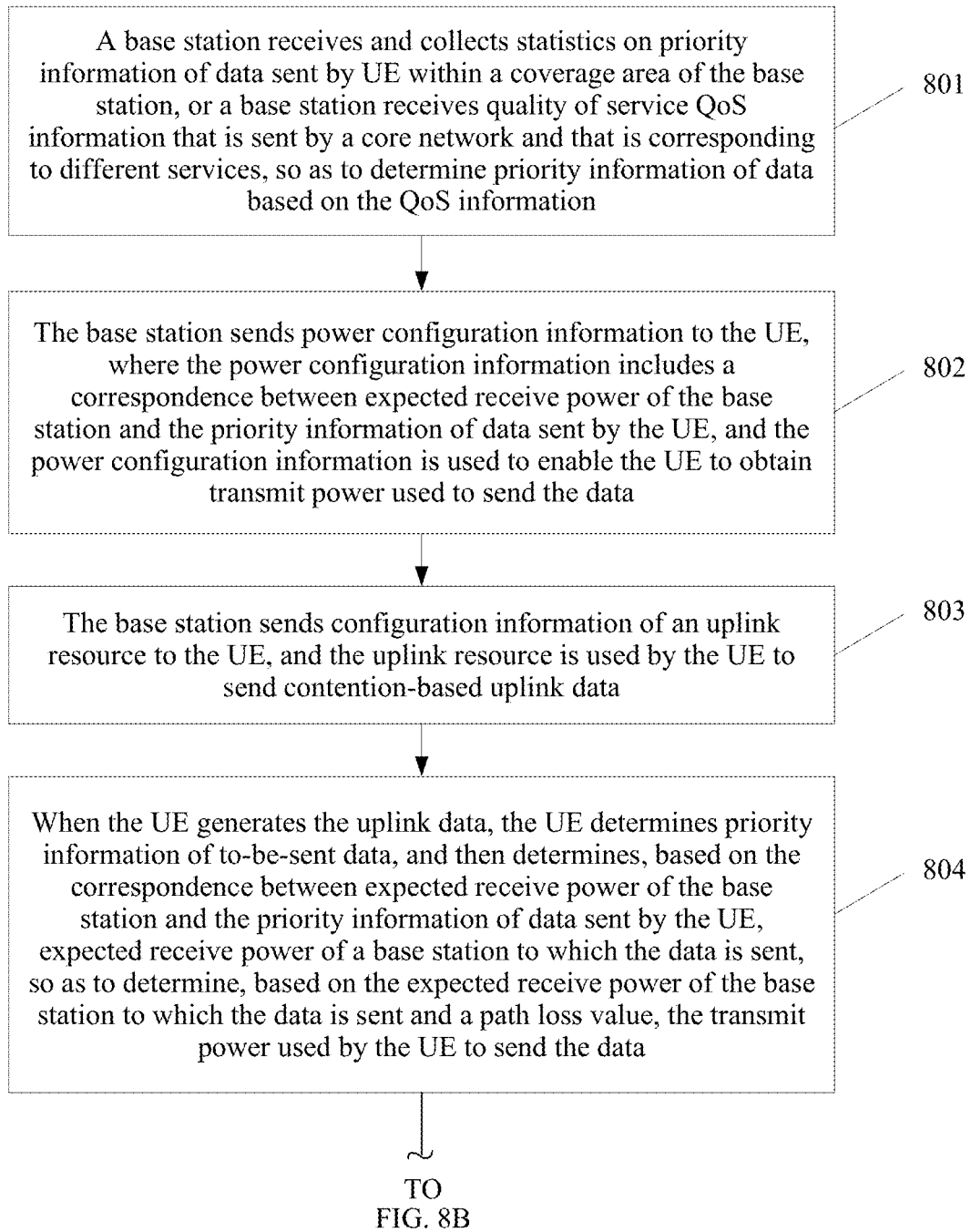
FIG. 8A and FIG. 8B are a schematic flowchart of a data sending method according to an embodiment of the present invention.
Figure 8B:
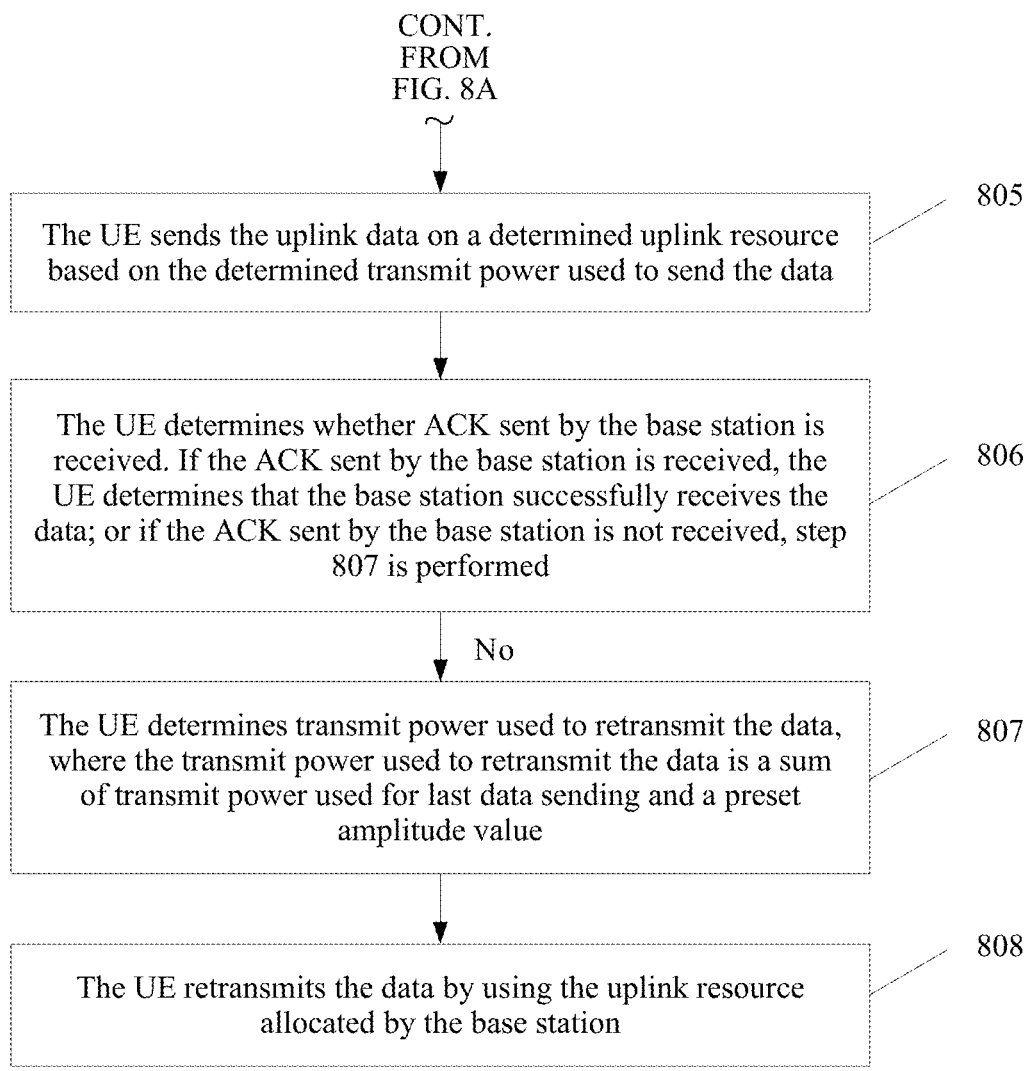

An embodiment of the present invention provides a data sending method. As shown in FIG. 8A and FIG. 8B, the method includes the following steps.

801. A base station receives and collects statistics on a priority of data sent by UE within a coverage area of the base station, or a base station receives quality of service (QoS) information that is sent by a core network and that is corresponding to different services, so as to determine a priority of data based on the QoS information.

When sending the priority to the base station, the UE may send priorities of all data of the UE to the base station at a time, or the UE may send, to the base station before sending data, a priority of data that needs to be sent.

The QoS information may include a latency of sending the data between the UE and the base station, a packet loss rate of sending the data between the UE and the base station, or the like. The base station determines the priority of the data based on an indicator such as a latency and a packet loss rate that are of the QoS information sent by the core network. A higher latency requirement may indicate a higher data priority, and to be specific, a longer latency indicates a lower data priority, and a shorter latency indicates a higher data priority.

802. The base station sends power configuration information to the UE, where the power configuration information includes a correspondence between expected receive power of the base station and the priority of data sent by the UE, and the power configuration information is used to enable the UE to obtain transmit power used to send data.

The base station may periodically send the power configuration information through broadcast, so that UE that recently enters the coverage area of the base station can receive the power configuration information in a timely manner, or the UE within the coverage area of the base station can receive latest power configuration information in a timely manner, or the base station can add a new correspondence to the power configuration information in a timely manner when the UE generates a new service type or a new data priority.

The expected receive power of the base station may be determined by the base station based on a receiving capability and a decoding capability of the base station. For example, after determining maximum receive power and minimum receive power of the base station, the base station divides a power range between the maximum receive power and the minimum receive power into different power levels at a same interval or different intervals, and the different power levels are corresponding to different service types or different data priorities. The receiving capability and the decoding capability of the base station are related to hardware setting and software setting of the base station.

Specifically, the base station may configure a power configuration list in a form of Table 1. A priority "0" represents a highest priority, and a larger number indicates a lower priority and smaller corresponding expected receive power of the base station.

TABLE 1

| Sequence number | Data priority | Expected receive power of a base station |
|---|---|---|
| 1 | 3 | −110 dBm |
| 2 | 0 | −100 dBm |
| 3 | 5 | −120 dBm |
| ... | ... | ... |

The numbers representing the different data priorities may also represent different service types. For example, 0 may represent a voice service, 3 may represent a roaming service, and 5 may represent an SMS service.

For example, if the power configuration list is shown in Table 1, the priority of the data that needs to be sent by the UE is 5, the expected receive power of the base station is obtained as −120 dBm, and the transmit power used by the UE to send the data may be calculated based on the expected receive power −120 dBm of the base station and a path loss value.

In an alternative manner, the power configuration information includes a correspondence between the expected receive power of the base station and a service type of the data sent by the UE. Different service types have different importance. More specifically, different expected receive power may be configured for different service types. A service type with high importance has high expected receive power, and a service type with low importance has low expected receive power. For example, if the service type of the data is represented by different numbers, the service type of the data that needs to be sent by the UE is 5, and the service type 5 corresponds to expected receive power −120 dBm of the base station in power information configured by the base station, the UE may calculate, based on the expected receive power −120 dBm of the base station and the path loss value, the transmit power used by the UE to send the data.

In another alternative manner, the power configuration information includes a correspondence between transmit power of the UE and a service type of the data sent by the UE. High transmit power of the UE is configured when the service type of the data sent by the UE has high importance, and low transmit power of the UE is configured when the service type of the data sent by the UE has low importance. For example, if the service type of the data is represented by different numbers, the service type of the data that needs to be sent by the UE is 5, and the service type 5 corresponds to transmit power −120 dBm in power information configured by the base station, the UE determines −120 dBm as the transmit power used by the UE to send the data.

In still another alternative manner, the power configuration information includes a correspondence between transmit power of the UE and a priority of the data sent by the UE. High transmit power of the UE is configured when the data sent by the UE has a high priority, and low transmit power of the UE is configured when the data sent by the UE has a low priority. For example, if the priority of the data is represented by different numbers, the priority of the data that needs to be sent by the UE is 5, and the priority 5 corresponds to transmit power −120 dBm in power information configured by the base station, the UE determines −120 dBm as the transmit power used by the UE to send the data.

803. The base station sends resource configuration information to the UE, and a resource is used by the UE to send contention-based uplink data.

The resource configuration information includes a common uplink resource allocated by the base station. The uplink resource may include time domain information and frequency domain information. There may be a plurality of uplink resources. A plurality of UEs covered by the base station may select an uplink resource from the common uplink resource, to send the uplink data.

When the power configuration information includes the correspondence between the expected receive power of the base station and a service type of the data sent by the UE or the correspondence between the expected receive power of the terminal 2 are in different radio environments, and therefore generate different path losses, so that receive power used when data of the terminal 1 reaches the base station may be the same as receive power used when data of the terminal 2 reaches the base station. In this case, when a resource conflict occurs, the base station cannot successfully receive any part of the data sent by the terminal 1 and the terminal 2. Therefore, different time-frequency resources may be configured for UEs in different radio environments, so as to avoid a case in which data with different transmit power cannot be successfully received by the base station when a resource conflict occurs.

For example, when the power configuration information includes the correspondence between transmit power of the UE and a service type of the data sent by the UE or the correspondence between transmit power of the UE and a priority of the to-be-sent data, the resource configuration information sent by the base station may include a reference signal received power RSRP range of the base station measured by the UE and a time-frequency resource configuration parameter, or a reference signal received quality RSRQ range and a time-frequency resource configuration parameter, and the time-frequency resource configuration parameter includes a physical resource block (PRB) parameter and a subframe (sf) parameter, or the time-frequency resource configuration parameter includes a PRB parameter and a system frame parameter.

For example, the base station may configure different uplink resources for different RSRP, so that the UE selects, based on the received RSRP of a reference signal, a corresponding resource to send the uplink data. Detailed configuration may be shown in Table 2:

TABLE 2

| Sequence number | Resource configuration | RSRP of UE |
|---|---|---|
| 1 | Resource 1 | −120 dBm ± 5 dBm |
| 2 | Resource 2 | −110 dBm ± 5 dBm |
| 3 | Resource 3 | −100 dBm ± 5 dBm |
| ... | ... | ... |

Specific resource configuration may be shown in Table 3. A frequency is represented in a vertical direction, and is represented by using a physical resource block PRB; and a time is represented in a horizontal direction, and is represented by using a subframe sf.

TABLE 3

| ... | | | | | | | | |
|---|---|---|---|---|---|---|---|---|
| PRB5 | Resource 1 | | Resource 3 | | Resource 3 | | | Resource 3 |
| PRB4 | Resource 1 | Resource 2 | Resource 3 | Resource 3 | Resource 1 | Resource 3 | Resource 2 | Resource 1 | Resource 3 |
| PRB3 | Resource 1 | Resource 2 | Resource 3 | Resource 1 | Resource 3 | Resource 2 | Resource 1 | Resource 3 |
| PRB2 | | Resource 2 | Resource 3 | | Resource 3 | Resource 2 | | Resource 3 |
| PRB1 | | Resource 2 | | | | Resource 2 | | |
| | Sf0 | Sf1 | Sf2 | Sf3 | Sf4 | Sf5 | Sf6 | Sf7 ... | the base station and a priority of to-be-sent data, the resource configuration information may include a time-frequency resource configuration parameter.

In a possible case, if the power configuration information includes the correspondence between transmit power of the UE and a priority of the data sent by the UE, it is assumed that if a priority of data sent by a terminal 1 is high, transmit power is high, and if a priority of data sent by a terminal 2 is low, transmit power is low. However, the terminal 1 and The resource configuration parameter may be a resource identifier indicating a start of a PRB, a resource identifier indicating an end of a PRB, and a subframe parameter. For example, the subframe parameter may be 10 bits (bitmap), 1 indicates that the subframe resource is valid, and time-frequency resource configuration parameters corresponding to the foregoing resource 1, resource 2, and resource 3 are shown in Table 4.

TABLE 4

| Resource | Start of the PRB | End of the PRB | Subframe parameter |
|---|---|---|---|
| 1 | 3 | 5 | 1001001000 |
| 2 | 1 | 4 | 0100010000 |
| 3 | 2 | 6 | 0010100010 |

Optionally, the subframe may be represented by using a start of the subframe or an end of the subframe, and the PRB is represented by a bitmap.

804. When the UE generates the uplink data, the UE determines a priority of to-be-sent data, and then determines, based on the correspondence between expected receive power of the base station and the priority of data sent by the UE, expected receive power of a base station to which the data is sent, so as to determine, based on the expected receive power of the base station to which the data is sent and a path loss value, the transmit power used by the UE to send the data.

When the uplink data of the UE is generated, the UE determines a service type or a priority of the data, and then determines expected receive power of the base station based on the power configuration information delivered by the base station. For example, when the power configuration information delivered by the base station is shown in Table 1, the UE determines that the priority of the data that needs to be sent is 5, and obtains the expected receive power −120 dBm of the base station according to Table 1. Then, the UE obtains the path loss value based on transmit power of a reference signal broadcast by the base station and receive power of the reference signal measured by the UE, and adds the expected receive power of the base station and the path loss value, to obtain the transmit power used by the UE to send the data.

805. The UE sends the uplink data on a determined uplink resource based on the determined transmit power used to send the data.

The UE may determine, from a plurality of uplink resources allocated by the base station, an appropriate uplink resource to send the uplink data.

806. The UE determines whether ACK sent by the base station is received. If the ACK sent by the base station is received, the UE determines that the base station successfully receives the data; or if the ACK sent by the base station is not received, step 807 is performed.

The base station monitors, on the uplink resource allocated in step 805, whether there is the uplink data. If the uplink data sent by the UE is received and is successfully decoded, the base station feeds back acknowledgement (ACK) to the UE, and it is considered that the base station successfully receives the data. If the UE does not receive feedback information of the base station, the UE considers that the base station does not successfully receive the data.

Figure 9:
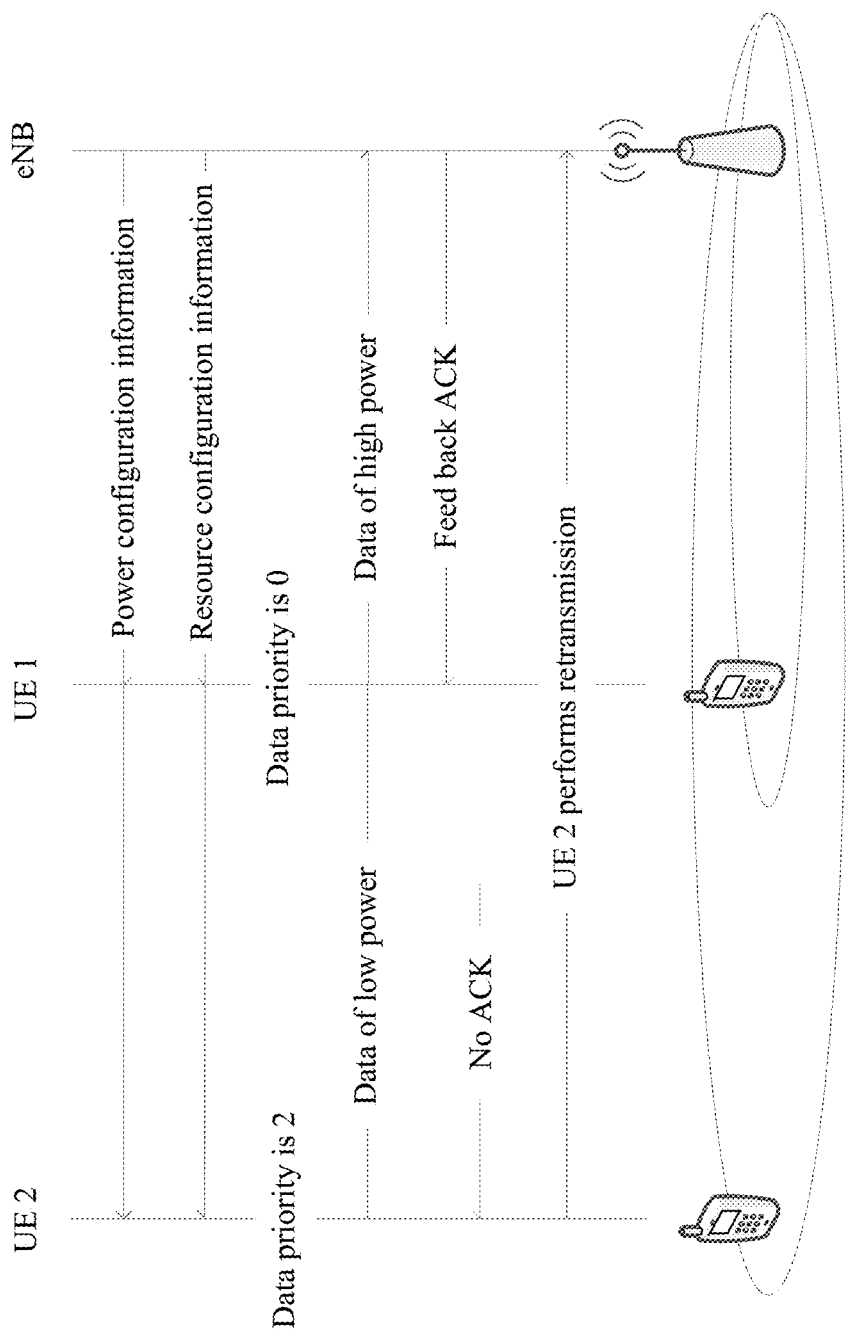
FIG. 9 is a schematic diagram of signal interaction in a data sending method according to an embodiment of the present invention.

According to the foregoing description of step 802 to step 806, as shown in FIG. 9, when UE 1 and UE 2 are in a coverage area of the base station, and the UE 1 and the UE 2 receive power configuration information and common uplink resource configuration information sent by the base station, transmit power corresponding to the UE 1 and the UE 2 may be determined based on priorities of data of the UE 1 and the UE 2 and the expected receive power of the base station in the power configuration information. It is assumed that a priority of the data of the UE 1 is higher than a priority of the data of the UE 2, and expected receive power of the base station corresponding to the UE 1 is higher than expected receive power of the base station corresponding to the UE 2. When the UE 1 and the UE 2 send the uplink data to the base station based on resource contention, the base station can successfully receive, on a same uplink resource, the data sent by the UE 1, and the base station feeds back ACK to the UE 1. When receiving no ACK, the UE 2 determines that the base station does not receive the data sent by the UE 2, the UE 2 determines to resend the data to the base station, and the UE 2 continues to perform step 807. In this way, when the plurality of UEs send the uplink data to the base station based on resource contention, it can be ensured that some UEs successfully send the data, so as to reduce a quantity of UEs that retransmit the data, and reduce an entire data sending latency.

807. The UE determines transmit power used to retransmit the data, where the transmit power used to retransmit the data is a sum of transmit power used for last data sending and a preset amplitude value.

The transmit power used to retransmit the data is the sum of the transmit power used for last data sending and the preset amplitude value. In this way, if the transmit power used to retransmit the data is increased, a success rate for retransmitting the data is increased, and a quantity of times of retransmitting the data may be reduced.

Table 1 in step 802 may further include the preset amplitude value. Specifically, the base station may configure a power configuration list in a form of Table 5.

TABLE 5

| Sequence number | Data priority | Expected receive power of a base station | Preset amplitude value |
|---|---|---|---|
| 1 | 3 | −110 dBm | 10 dBm |
| 2 | 0 | −100 dBm | 10 dBm |
| 3 | 5 | −120 dBm | 10 dBm |
| ... | ... | ... | ... |

The preset amplitude values may be the same, and all the preset amplitude values are 10 dBm as shown in Table 5, or different preset amplitude values may be set based on different data priorities. For example, the priority of the data sent by the UE is 3, the expected receive power of the base station is −110 dBm when the data is first transmitted, the expected receive power of the base station is −100 dBm when the data is retransmitted, and then the transmit power used to retransmit the data is determined based on the path loss value.

808. The UE retransmits the data by using the uplink resource allocated by the base station.

In this way, different expected receive power of the base station is set for data corresponding to different service types or different priorities, so that the transmit power used by the terminal to send the data is determined based on the determined expected receive power, so as to ensure that uplink data with high service type importance or high data priority has relatively high expected receive power of the base station, and uplink data with low service type importance or with low data priority has relatively low expected receive power of the base station. In this way, when a resource conflict occurs because the plurality of UEs send the data based on resource contention, it can be ensured that data of high expected receive power is successfully sent, and the base station receives the high-power data, so as to reduce a quantity of UEs that retransmit the data, and reduce an entire data sending latency.

The following describes a case in which the UE sends the uplink data, and the power configuration information includes the correspondence between the expected receive power of the base station and the information about measurement of the radio environment of the base station by the UE.

Figure 10A:
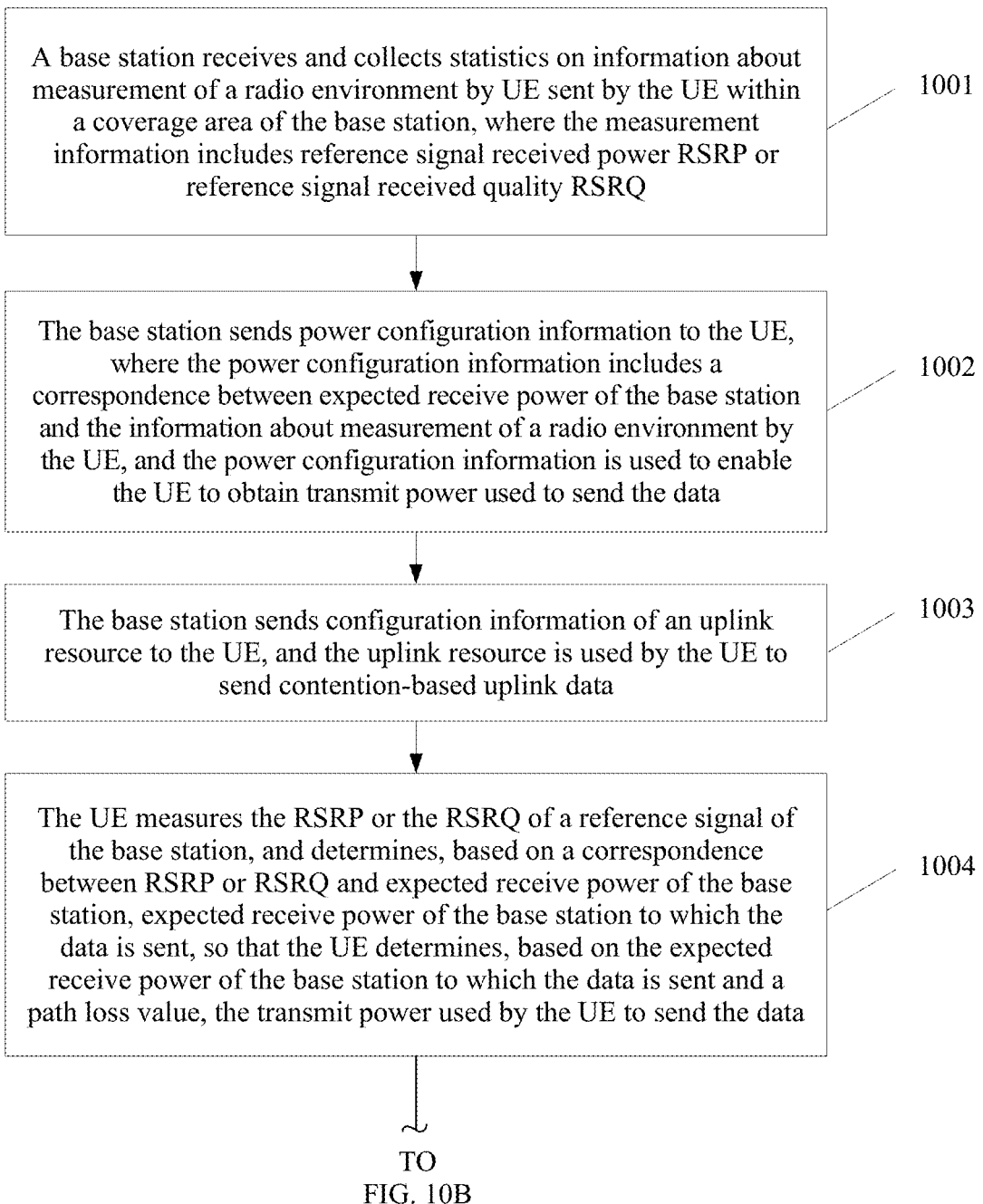
FIG. 10A and FIG. 10B are a schematic flowchart of a data sending method according to an embodiment of the present invention.
Figure 10B:
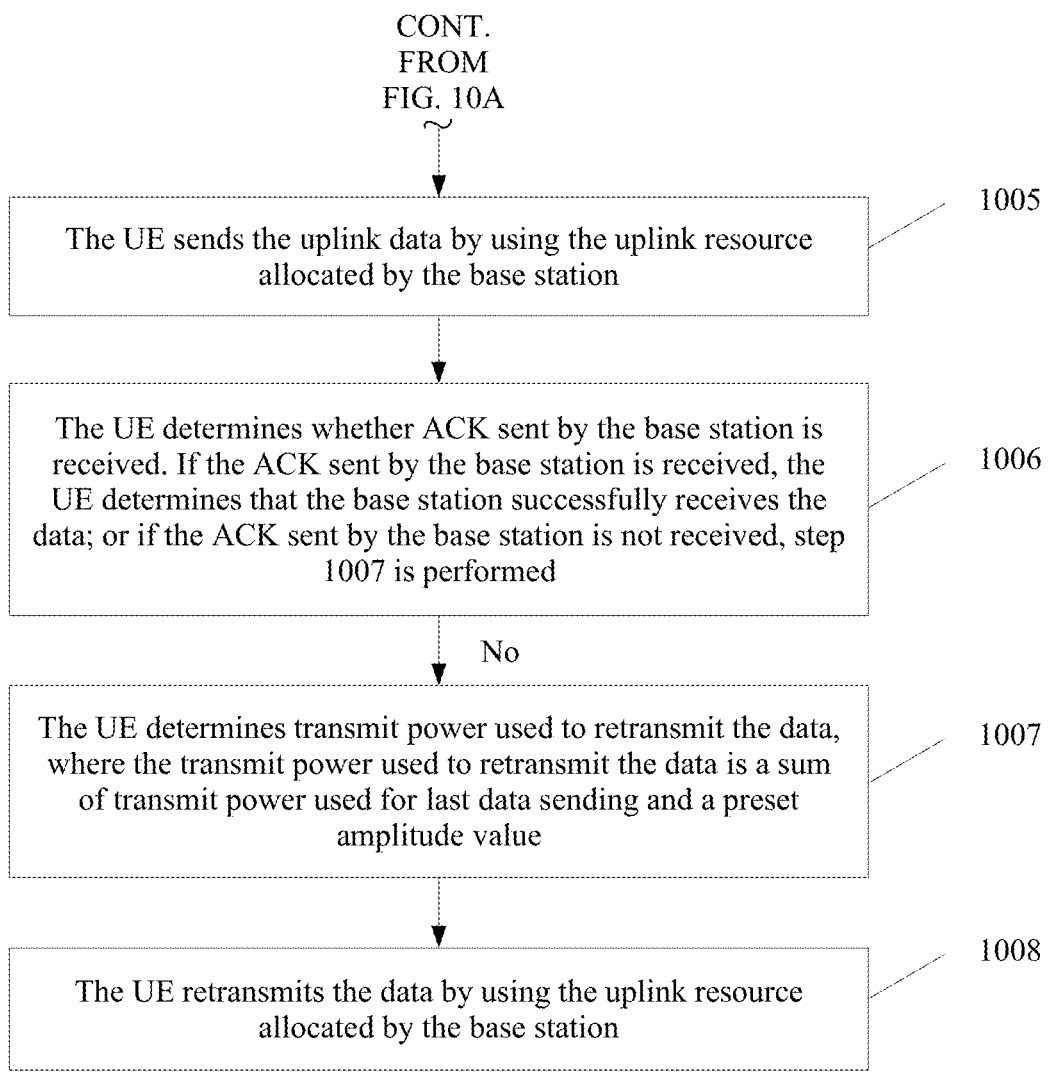

An embodiment of the present invention provides a data sending method. As shown in FIG. 10A and FIG. 10B, the method includes the following steps.

1001. A base station receives and collects statistics on information about measurement of a radio environment by UE sent by the UE within a coverage area of the base station, where the measurement information includes reference signal received power RSRP or reference signal received quality RSRQ.

That is, in this embodiment, a radio environment in which the UE is located may be represented by using the reference signal received power RSRP or the reference signal received quality RSRQ.

1002. The base station sends power configuration information to the UE, where the power configuration information includes a correspondence between expected receive power of the base station and the information about measurement of the radio environment by the UE, and the power configuration information is used to enable the UE to obtain transmit power used to send the data.

The base station may configure the power configuration information in a form of a list, as shown in Table 6.

TABLE 6

| Sequence number | RSRP or RSRQ of a base station measured by UE | Expected receive power of a base station |
| --- | --- | --- |
| 1 | −90 dBm | −100 dBm |
| 2 | −100 dBm | −110 dBm |
| 3 | −110 dBm | −120 dBm |
| ... | ... | ... |

Larger RSRP or the RSRQ of the base station measured by the UE indicates larger expected receive power of the base station. This is because if the RSRP or the RSRQ of the base station measured by the UE is larger, signal quality of the radio environment in which the UE is located is better, and it is easier to successfully send uplink data of the UE. Therefore, when the expected receive power of the base station is larger, it can be ensured that the uplink data of the UE is more easily sent successfully. Otherwise, if the RSRP or the RSRQ of the base station measured by the UE is smaller, signal quality of the radio environment in which the UE is located is worse, and it is more difficult to successfully send uplink data of the UE. Therefore, if the expected receive power of the base station is smaller, data of UE with relatively high transmit power can be successfully sent when the UE sends the data based on resource contention. That is, when the data is sent based on resource contention, if interference to UE with relatively high expected receive power in different radio environments is smaller, data of the UE with the relatively high expected receive power in the different radio environments can be successfully sent.

In an alternative manner, the power configuration information includes a correspondence between transmit power of the UE and the information about measurement of the radio environment of the base station by the UE. When the radio environment of the base station measured by the UE is better, to be specific, when the RSRP or the RSRQ of the base station measured by the UE is larger, the transmit power of the UE is larger. It can be ensured that data with high transmit power is successfully sent as much as possible.

1003. The base station sends configuration information of an uplink resource to the UE, and the uplink resource is used by the UE to send contention-based uplink data.

For the configuration information of the uplink resource, refer to step 803.

1004. The UE measures the RSRP or the RSRQ of the base station, and determines, based on a correspondence between RSRP or RSRQ and expected receive power of the base station, expected receive power of the base station to which the data is sent, so that the UE determines, based on the expected receive power of the base station to which the data is sent and a path loss value, the transmit power used by the UE to send the data.

When the uplink data of the UE is generated, the UE measures the RSRP or the RSRQ of the base station, and then determines the expected receive power of the base station based on the power configuration information delivered by the base station. For example, when the power configuration information delivered by the base station is shown in Table 6, the RSRP of the base station measured by the UE is −90 dBm, and the expected receive power of the base station is obtained as −100 dBm according to Table 6. The UE further obtains the path loss value based on transmit power of a reference signal broadcast by the base station and receive power of the reference signal measured by the UE, and adds the expected receive power of the base station and the path loss value, to obtain the transmit power used by the UE to send the data.

1005. The UE sends the uplink data by using the uplink resource allocated by the base station.

The UE may determine, from a plurality of uplink resources allocated by the base station, an appropriate uplink resource to send the uplink data.

1006. The UE determines whether ACK sent by the base station is received. If the ACK sent by the base station is received, the UE determines that the base station successfully receives the data; or if the ACK sent by the base station is not received, step 1007 is performed.

The base station monitors, on the uplink resource allocated in step 1005, whether there is the uplink data. If the uplink data sent by the UE is received and is successfully decoded, the base station feeds back acknowledgement to the UE, and it is considered that the base station successfully receives the data. If the UE does not receive feedback information of the base station, the UE considers that the base station does not successfully receive the data.

Figure 11:
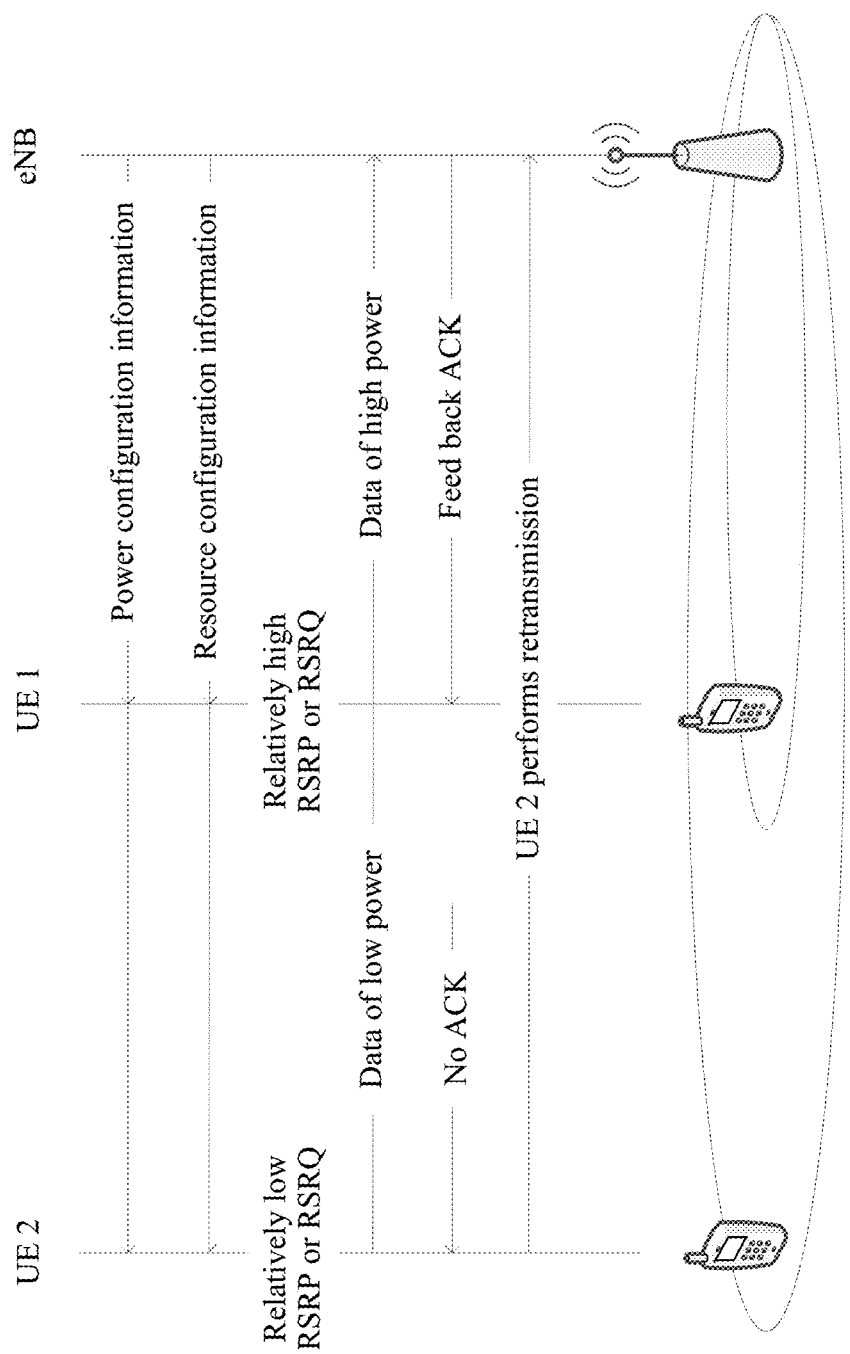
FIG. 11 is a schematic diagram of signal interaction in a data sending method according to an embodiment of the present invention.

According to the foregoing description of step 1002 to step 1006, as shown in FIG. 11, when UE 1 and UE 2 are in a coverage area of the base station, and the UE 1 and the UE 2 receive power configuration information and common uplink resource configuration information sent by the base station, transmit power corresponding to the UE 1 and the UE 2 may be determined based on radio environments of the UE 1 and the UE 2 and the expected receive power of the base station in the power configuration information. It is assumed that RSRP or RSRQ of the UE 1 is higher than RSRP or RSRQ of the UE 2, and expected receive power of the base station corresponding to the UE 1 is higher than expected receive power of the base station corresponding to the UE 2. When the UE 1 and the UE 2 send the uplink data to the base station based on resource contention, because power used by the base station to receive the data sent by the UE 1 is higher than power used by the base station to receive the data sent by the UE 2, if a resource conflict occurs between the UE 1 and the UE 2, the base station can successfully receive, on a same uplink resource, the data sent by the UE 1, and the base station feeds back ACK to the UE 1. When receiving no ACK, the UE 2 determines that the base station does not receive the data sent by the UE 2, the UE 2 determines to resend the data to the base station, and the UE 2 continues to perform step 1007.

1007. The UE determines transmit power used to retransmit the data, where the transmit power used to retransmit the data is a sum of transmit power used for last data sending and a preset amplitude value.

Specifically, Table 3 in step 1002 may alternatively be configured as a power configuration list in a form of Table 7.

TABLE 7

| Sequence number | RSRP of a base station measured by UE | Expected receive power of a base station | Preset amplitude value |
|---|---|---|---|
| 1 | −90 dBm | −100 dBm | 10 dBm |
| 2 | −100 dBm | −110 dBm | 10 dBm |
| 3 | −110 dBm | −120 dBm | 10 dBm |
| ... | ... | ... | ... |

The preset amplitude values may be the same, and all the preset amplitude values are 10 dBm as shown in Table 7, or different preset amplitude values may be set based on different RSRP values. For example, the RSRP that is measured by the UE and that is of reference information sent by the base station is −100 dBm, the expected receive power of the base station is −110 dBm when the data is first transmitted, the expected receive power of the base station is −100 dBm when the data is retransmitted, and then the transmit power used to retransmit the data is determined based on the path loss value.

1008. The UE retransmits the data by using the uplink resource allocated by the base station.

In this way, different expected receive power of the base station or different transmit power of the terminal is set for data corresponding to different radio environments. A larger RSRP value or a larger RSRQ value indicates larger expected receive power of the base station. In this way, when the plurality of UEs send the data based on resource contention, and a resource conflict occurs, it can be ensured that some data with relatively high receive power is successfully sent, so as to reduce a quantity of UEs that retransmit the data, and reduce an entire data sending latency.

The following describes a case in which the data is sent between UEs, and the base station configures the transmit power of the UEs based on different service types or different data priorities.

Figure 12A:
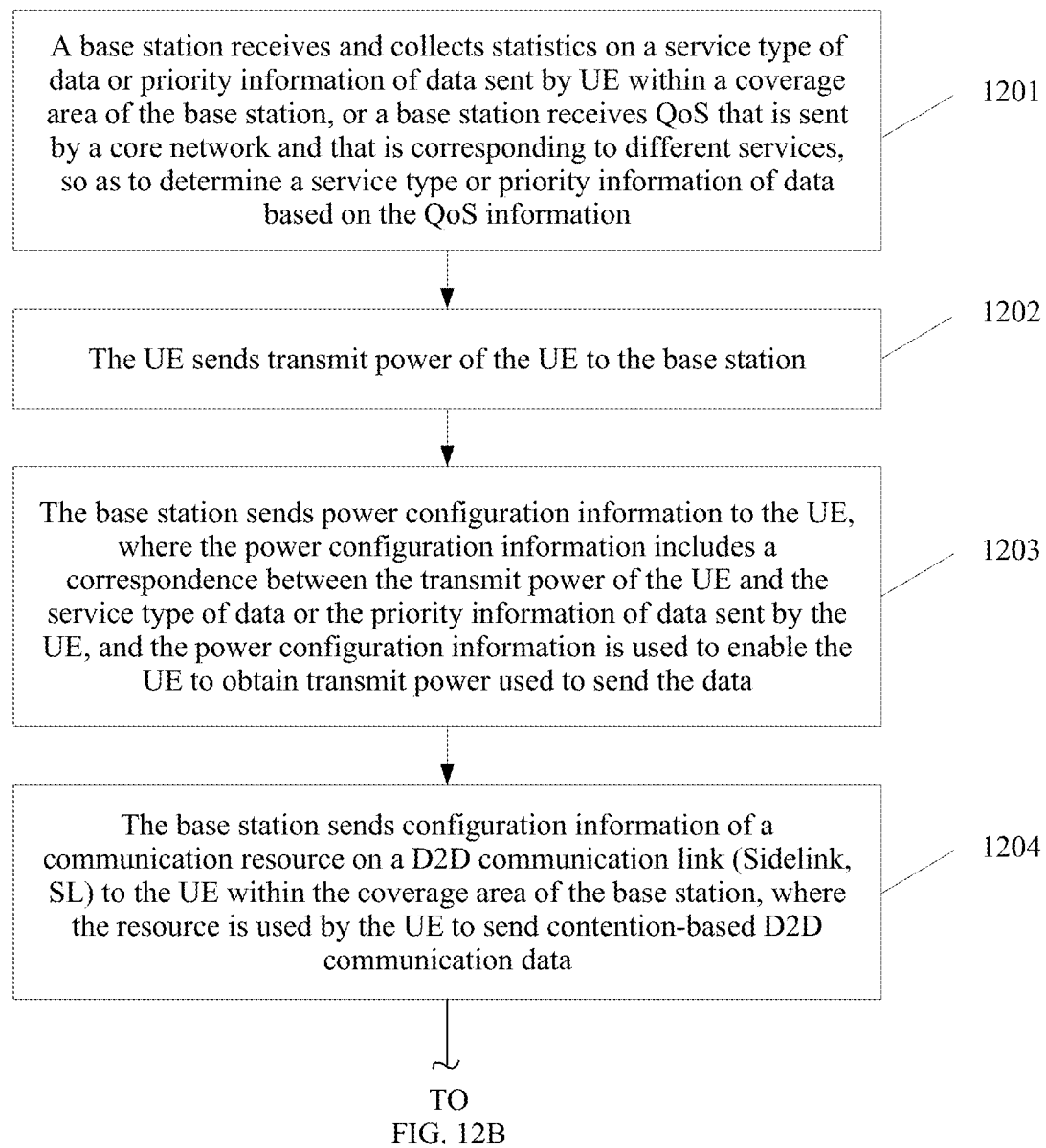
FIG. 12A and FIG. 12B are a schematic flowchart of a data sending method according to an embodiment of the present invention.
Figure 12B:
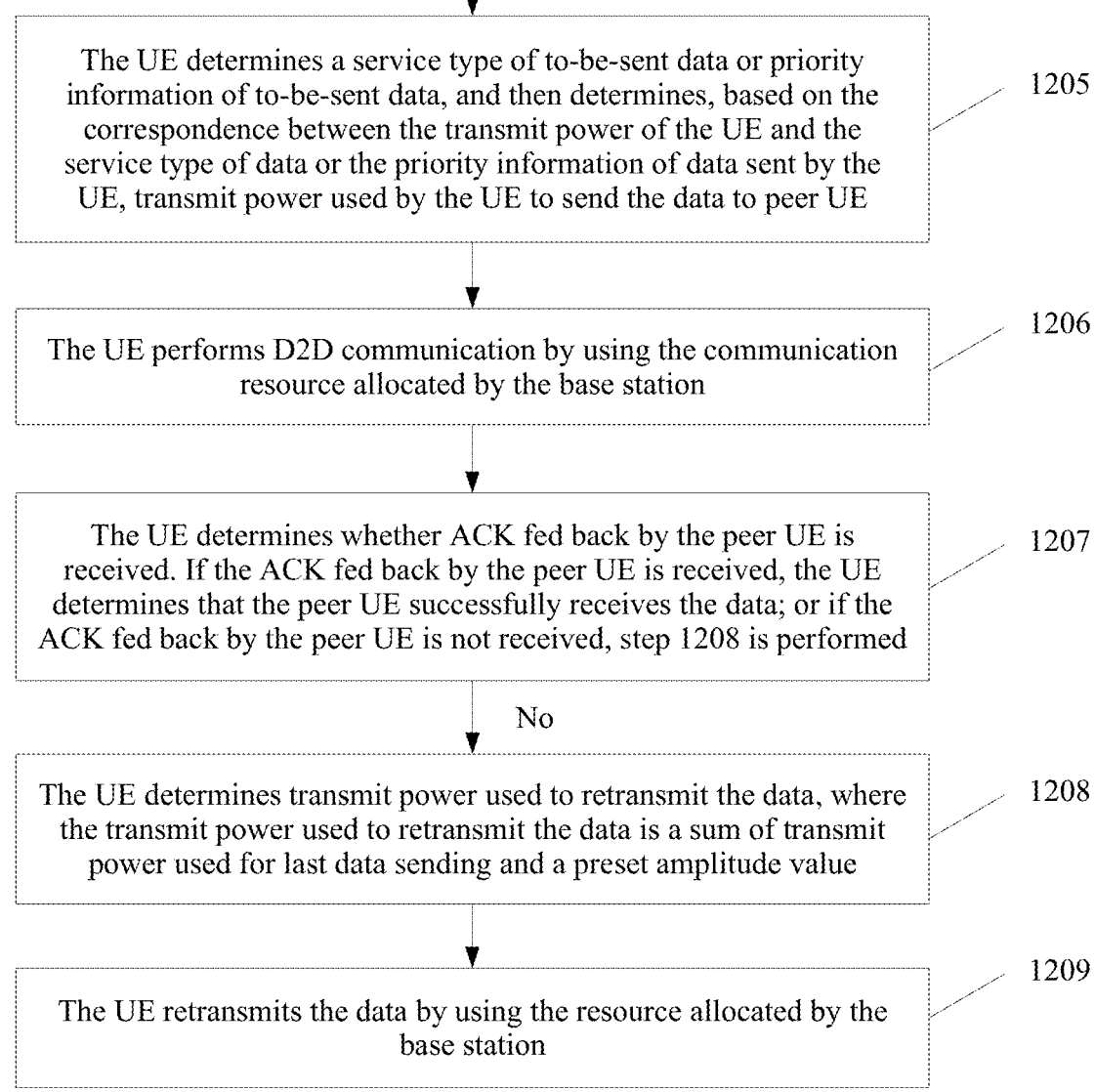

An embodiment of the present invention provides a data sending method. As shown in FIG. 12A and FIG. 12B, the method includes the following steps.

1201. A base station receives and collects statistics on a service type of data or a priority of data sent by UE within a coverage area of the base station, or a base station receives QoS information that is sent by a core network and that is corresponding to different services, so as to determine a service type or a priority of data based on the QoS information.

For details about a specific time at which the UE sends the service type or the priority of the data to the base station, and how the base station determines the service type or the priority of the data based on the QoS information sent by the core network, refer to step 801.

1202. The UE sends transmit power of the UE to the base station.

A transmit power value of the UE may be determined by the UE based on a receiving capability and a decoding capability of the UE.

1203. The base station sends power configuration information to the UE, where the power configuration information includes a correspondence between the transmit power of the UE and the service type of data or the priority of data sent by the UE, and the power configuration information is used to enable the UE to obtain transmit power used to send the data.

In this embodiment shown in FIG. 8A and FIG. 8B, expected receive power of the base station is corresponding to the service type of the data or the priority of the data sent by the UE. In this embodiment, the transmit power of the UE is corresponding to the service type of the data or the priority of the data sent by the UE. For example, after determining maximum receive power and minimum receive power of the UE, the base station divides a power range between the maximum receive power and the minimum receive power into different power levels at a same interval or different intervals, and the different power levels are corresponding to different service types or different data priorities.

Specifically, the base station may configure a power configuration list in a form of Table 8. A priority "0" indicates a highest priority.

TABLE 8

| Sequence number | Data priority | Transmit power of UE |
|---|---|---|
| 1 | 3 | −110 dBm |
| 2 | 0 | −100 dBm |
| 3 | 5 | −120 dBm |
| ... | ... | ... |

For example, if the power configuration list is shown in Table 8, and the priority of the data that needs to be sent by the UE is 3, the transmit power used by the UE to send the data is −110 dBm.

In an alternative manner, the base station configures the transmit power of the UE based on measurement information of radio environments of different peer ends. When measurement information of a radio environment of a peer end is better, to be specific, when RSRP or RSRQ that is measured by the UE and that is of a reference signal sent by the peer end is higher, the transmit power of the UE may be higher, so that when a resource conflict occurs, the peer end can receive data with high transmit power as much as possible.

1204. The base station sends configuration information of a communication resource on a D2D communication link (Sidelink, SL) to the UE within the coverage area of the base station, where the resource is used by the UE to send contention-based D2D communication data.

The configuration information of the communication resource may be time domain information and frequency domain information. There may be a plurality of pieces of configuration information of communication resources. The plurality of UEs covered by the base station may determine, based on the configuration information of the communication resources, a resource that is used for sending the data, to perform D2D communication.

In a possible case, when the power configuration information includes the transmit power of the UE and the service type of the data or the priority of the data sent by the UE, data sent by transmit ends at different transmit power may reach a receive end at a same receive power, and consequently when a resource conflict occurs, the receive end cannot successfully receive the data sent by the transmit end. Therefore, similar to step 803, resource configuration information sent by the base station may include a reference signal received power RSRP range measured by the UE and a time-frequency resource configuration parameter, or include a reference signal received quality RSRQ range and a time-frequency resource configuration parameter, and the time-frequency resource configuration parameter includes a physical resource block PRB parameter and a subframe parameter, or the time-frequency resource configuration parameter includes a PRB parameter and a system frame parameter. For details, refer to step 803.

For example, if the power configuration information includes a correspondence between transmit power of the UE and a priority of the data sent by the UE, if a priority of data sent by a terminal 1 is high, transmit power is high, and if a priority of data sent by a terminal 2 is low, transmit power is low. However, the terminal 1 and the terminal 2 are in different radio environments, and therefore generate different path losses, so that receive power used when the data of the terminal 1 reaches the peer end may be the same as receive power used when the data of the terminal 2 reaches the peer end. In this case, when a resource conflict occurs, the peer end cannot successfully receive any part of data. Therefore, different time-frequency resources may be configured for UEs in different radio environments, so as to avoid a case in which data with different transmit power cannot be successfully received by the peer end when a resource conflict occurs.

1205. The UE determines a service type of to-be-sent data or a priority of to-be-sent data, and then determines, based on the correspondence between the transmit power of the UE and the service type of data or the priority of data sent by the UE, transmit power used by the UE to send the data to peer UE.

When uplink data of the UE is generated, the UE determines a service type or a priority of the data, and then determines the transmit power of the UE based on the power configuration information delivered by the base station. For example, when the power configuration information delivered by the base station is shown in Table 8, the UE determines that the priority of the data that needs to be sent is 3, and obtains the transmit power −110 dBm of the UE according to Table 8. In other words, the transmit power used by the UE to send the data with a priority 3 is −110 dBm.

1206. The UE performs D2D communication by using the communication resource allocated by the base station.

The UE selects an appropriate resource based on the configuration information of the communication resource allocated by the base station, to send the data to the peer UE.

1207. The UE determines whether ACK fed back by the peer UE is received. If the ACK fed back by the peer UE is received, the UE determines that the peer UE successfully receives the data; or if the ACK fed back by the peer UE is not received, step 1208 is performed.

The peer UE herein is the other UE with which the UE performs D2D communication. When the plurality of UEs send data to a same UE, the peer UE monitors, on a resource allocated by the base station, whether there is D2D data. If the D2D data that is sent by the UE that sends the data is received, and is successfully decoded, ACK is fed back to the UE that sends the data, and the ACK indicates that the data is successfully received. If the UE that sends the data does not receive the ACK from the peer UE, the UE that sends the data considers that the peer UE does not successfully receive the data.

Figure 13:
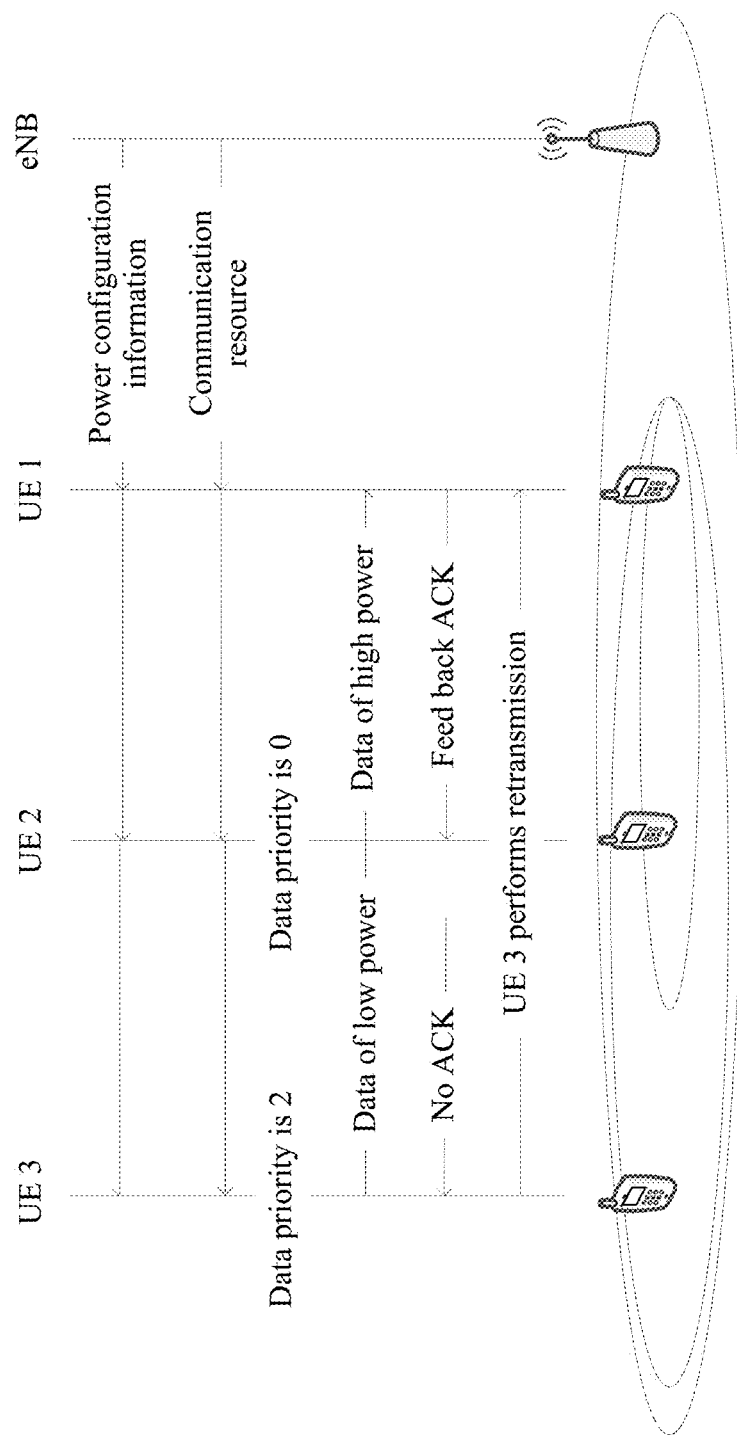
FIG. 13 is a schematic diagram of signal interaction in a data sending method according to an embodiment of the present invention.

For example, as shown in FIG. 13, it is assumed that UE 2 and UE 3 send D2D data to UE 1 based on resource contention. The UE 1 monitors, on a resource allocated by the base station, whether there is D2D data. If the UE 1 receives D2D data sent by the UE 2, and successfully decodes the D2D data, the UE 1 feeds back ACK to the UE 2, and the UE 2 considers that the UE 1 successfully receives the data. If the UE 3 does not receive the ACK from the UE 1, the UE 3 considers that the UE 1 does not successfully receive the data.

1208. The UE determines transmit power used to retransmit the data, where the transmit power used to retransmit the data is a sum of transmit power used for last data sending and a preset amplitude value.

Table 8 in step 1203 may further include the preset amplitude value. Specifically, the base station may configure a power configuration list in a form of Table 9.

TABLE 9

| Sequence number | Data priority | Transmit power of UE | Preset amplitude value |
|---|---|---|---|
| 1 | 3 | −110 dBm | 10 dBm |
| 2 | 0 | −100 dBm | 10 dBm |
| 3 | 5 | −120 dBm | 10 dBm |
| . . . | . . . | . . . | . . . |

For specific setting of the preset amplitude value, refer to step 807.

1209. The UE retransmits the data by using the resource allocated by the base station.

In this embodiment of the present invention, when performing D2D communication, the UE sets, based on the service type of the data or the priority of the data, different transmit power for data that needs to be sent, or sets, based on different radio environments, different transmit power for data that needs to be sent. In this way, when a resource conflict occurs, the peer end can successfully receive data with relatively high transmit power, so as to reduce a quantity of UEs that retransmit the data, and reduce an entire data sending latency.

The foregoing has mainly described the solutions provided in the embodiments of the present invention from a perspective of the base station and the terminal. It may be understood that, to implement the foregoing functions, the base station and the terminal include a hardware structure and/or a software module for performing corresponding functions. A person of ordinary skill in the art should be easily aware that, the algorithm steps described with reference to the embodiments disclosed in this specification may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the base station and the terminal based on the foregoing method example. For example, each function module may be obtained through division based on a corresponding function, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 14:
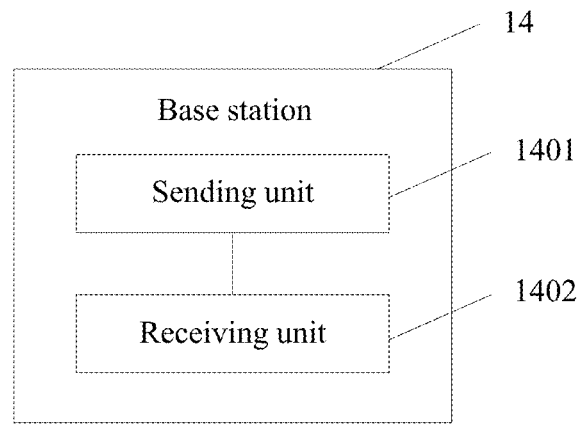
FIG. 14 is a schematic structural diagram of a base station according to an embodiment of the present invention.

When each function module is obtained through division for each corresponding function, FIG. 14 is a possible schematic structural diagram of a base station 14 used in the foregoing embodiments. The base station 14 includes a sending unit 1401 and a receiving unit 1402. The sending unit 1401 is configured to support the base station in performing the process 701 in FIG. 7, the process 802 and the process 803 in FIG. 8A, the process 1002 and the process 1003 in FIG. 10A, or the process 1203 and the process 1204 in FIG. 12A and FIG. 12B. The receiving unit 1402 is configured to support the base station in performing the process 801 in FIG. 8A, the process 1001 in FIG. 10A, or the process 1201 in FIG. 12A. All related content of steps in the foregoing method embodiments may be cited in function descriptions of corresponding functional modules, and details are not described herein again.

Figure 15:
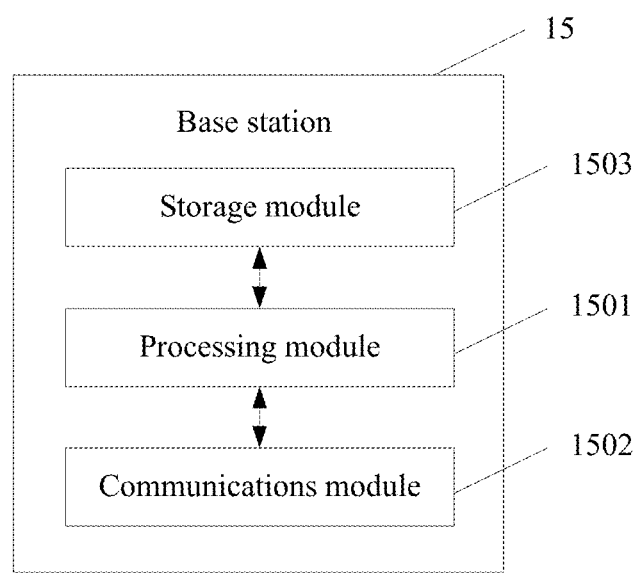
FIG. 15 is a schematic structural diagram of a base station according to an embodiment of the present invention.

When an integrated unit is used, FIG. 15 is a possible schematic structural diagram of the base station in the foregoing embodiments. The base station 15 includes a processing module 1501 and a communications module 1502. The processing module 1501 is configured to control and manage an action of the base station. For example, the processing module 1501 is configured to support the base station in performing the process 701 in FIG. 7, the process 801 in FIG. 8A, the process 1001 in FIG. 10A, or the process 1201 in FIG. 12A. The communications module 1502 is configured to support the base station in communicating with another network entity, for example, sending power configuration information to UE and receiving service data, a priority of service data, or the like sent by a terminal. The base station may further include a storage module 1503. The storage module 1503 is configured to store program code and data of the base station. For example, the storage module 1503 is configured to store a file and the like related to the power configuration information in this embodiment of the present invention.

The processing module 1501 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 1502 may be a transceiver, a transceiver circuit, a communications interface, or the like. The storage module 1503 may be a memory.

Figure 16:
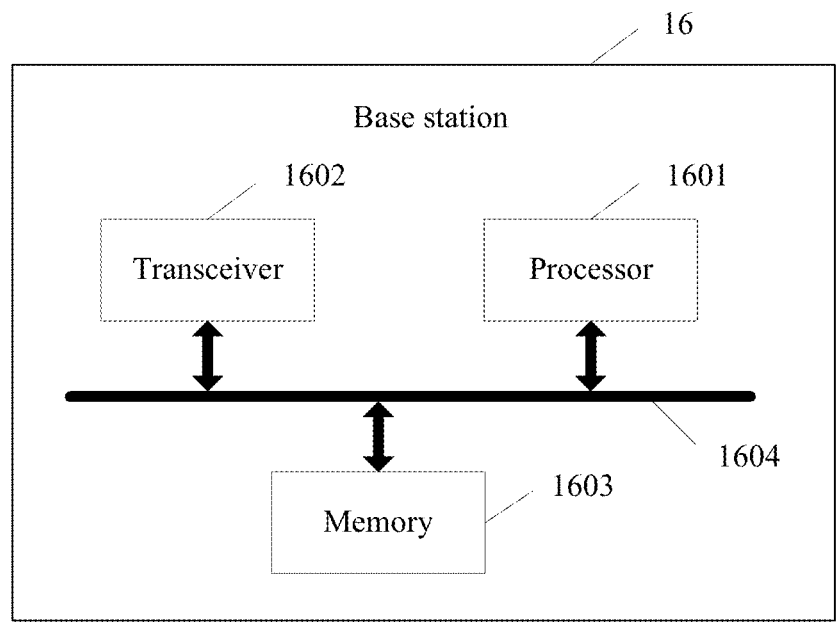
FIG. 16 is a schematic structural diagram of a base station according to an embodiment of the present invention.

When the processing module 1501 is a processor, and the communications module 1502 is a transceiver, and the storage module 1503 is a memory, the base station in this embodiment of the present invention may be the base station shown in FIG. 16.

As shown in FIG. 16, the base station 16 includes a processor 1601, a transceiver 1602, a memory 1603, and a bus 1604. The transceiver 1602, the processor 1601, and the memory 1603 are interconnected by using the bus 1604. The bus 1604 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 16, but this does not mean that there is only one bus or only one type of bus.

Figure 17:
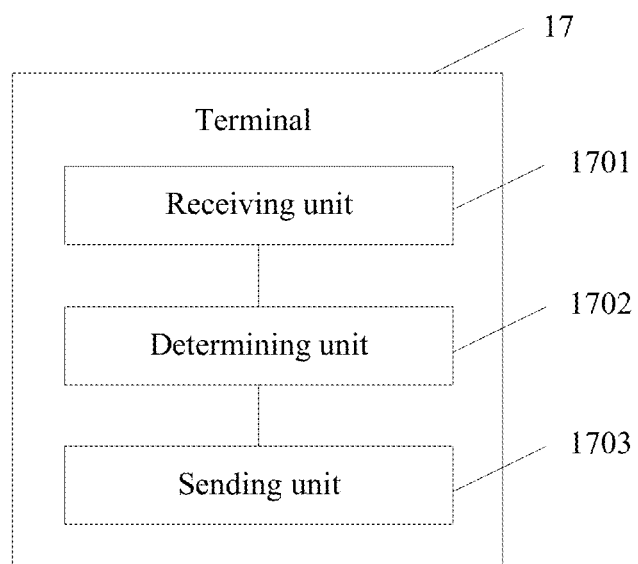
FIG. 17 is a schematic structural diagram of a terminal according to an embodiment of the present invention.

In a case of dividing function modules based on functions, FIG. 17 is a possible schematic structural diagram of a terminal 17 in the foregoing embodiments. The terminal includes a receiving unit 1701, a determining unit 1702, and a sending unit 1703. The determining unit 1701 is configured to support the terminal in performing the process 702 in FIG. 7. All related content of steps in the foregoing method embodiments may be cited in function descriptions of corresponding functional modules, and details are not described herein again.

Figure 18:
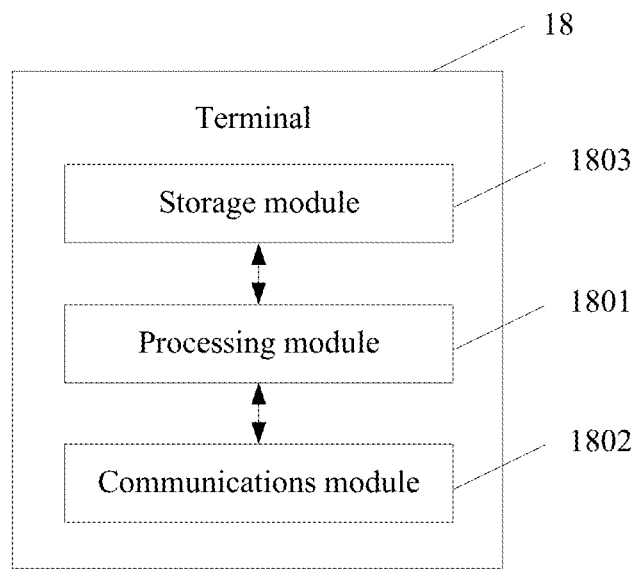
FIG. 18 is a schematic structural diagram of a terminal according to an embodiment of the present invention.

When an integrated unit is used, FIG. 18 is a possible schematic structural diagram of the terminal in the foregoing embodiment. A terminal 18 includes a processing module 1801 and a communications module 1802. The processing module 1801 is configured to control and manage an action of the terminal. For example, the processing module 1801 is configured to support the terminal in performing the process 702 in FIG. 7, the process 804, the process 806, and the process 807 in FIG. 8A and FIG. 8B, the process 1004, the process 1006, and the process 1007 in FIG. 10A and FIG. 10B, or the process 1205, the process 1207, and the process 1208 in FIG. 12B. The communications module 1802 is configured to support the terminal in communicating with another network entity, for example, sending a data service type or a data priority to a base station and receiving power configuration information or the like sent by the base station. The terminal may further include a storage module 1803. The storage module 1803 is configured to store program code and data of the terminal. For example, the storage module 1803 is configured to store a file and the like related to the power configuration information in this embodiment of the present invention.

The processing module 1801 may be a processor or a controller, for example, may be a central processing unit CPU, a general purpose processor, a digital signal processor DSP, an application-specific integrated circuit ASIC, a field programmable gate array FPGA or another programmable logic device, a transistor logic device, a hardware component, or any combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 1802 may be a transceiver, a transceiver circuit, a communications interface, or the like. The storage module 1803 may be a memory.

Figure 19:
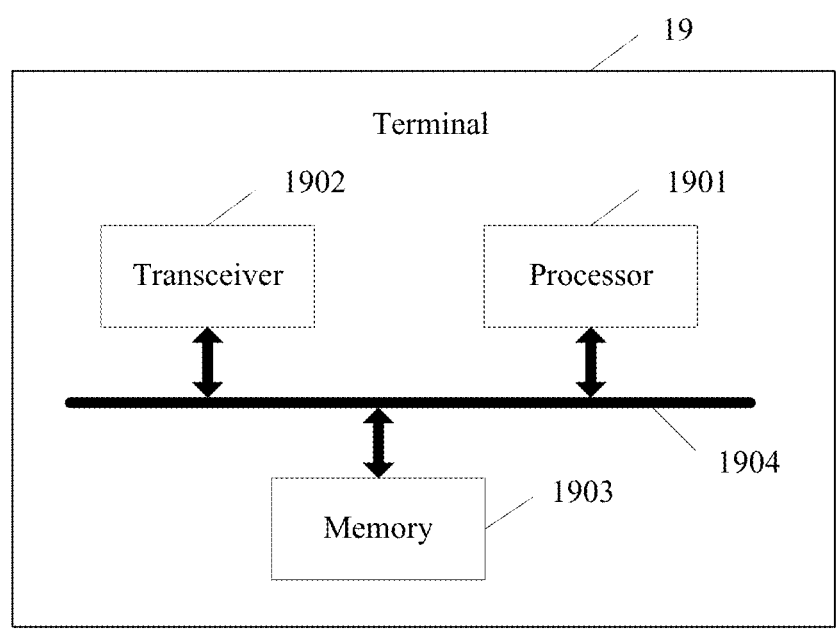
FIG. 19 is a schematic structural diagram of a terminal according to an embodiment of the present invention.

When the processing module 1801 is a processor, the communications module 1802 is a transceiver, and the storage module 1803 is a memory, the terminal in this embodiment of the present invention may be a terminal shown in FIG. 19.

As shown in FIG. 19, a terminal 19 includes: a processor 1901, a transceiver 1902, a memory 1903, and a bus 1904. The transceiver 1902, the processor 1901, and the memory 1903 may be interconnected by using the bus 1904. The bus 1904 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 19, but this does not mean that there is only one bus or only one type of bus.

Method or algorithm steps described in combination with the content disclosed in the present invention may be implemented by hardware, or may be implemented by a processor by executing a software instruction. The software instruction may be formed by a corresponding software module. The software module may be stored in a random access memory (RAM for short), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A data sending method comprising:
sending, by a network device, power configuration information to a terminal, wherein the power configuration information comprises a one-to-one correspondence between power information and terminal status information, and the power configuration information is for enabling the terminal to obtain transmit power for sending data; and
receiving, by the network device, the data from the terminal, wherein the transmit power of the data is determined by the terminal based on the power configuration information;
wherein the terminal status information comprises a priority of the data sent by the terminal; and
the power information comprises at least one of expected receive power of the network device, transmit power used by the terminal to communicate with the network device, and transmit power used by the terminal to perform device-to-device (D2D) communication,
wherein the power configuration information further comprises an amplitude value, the amplitude value is for enabling the terminal to determine transmit power for retransmitting the data, and the transmit power used to retransmit the data is a sum of transmit power for last data sending and the amplitude value.

2. The method according to claim 1, further comprising:
receiving, by the network device, the priority of the data from the terminal.

3. The method according to claim 1, further comprising:
sending, by the network device, a resource configuration message to the terminal, wherein the resource configuration message comprises one of the following:
(a) a reference signal received power (RSRP) range of the terminal and a time-frequency resource configuration parameter,
(b) a reference signal received quality (RSRQ) range and a time-frequency resource configuration parameter which comprises either (i) a physical resource block (PRB) parameter and a subframe parameter, or (ii) a PRB parameter and a system frame parameter.

4. A data sending method comprising:
receiving, by a terminal, power configuration information from a network device, wherein the power configuration information comprises a one-to-one correspondence between power information and terminal status information; and
determining, by the terminal based on the power configuration information, transmit power used by the terminal to send data;
wherein the terminal status information comprises a priority of the data sent by the terminal;
the power information comprises at least one of expected receive power of the network device, transmit power used by the terminal to communicate with the network device, and transmit power used by the terminal to perform device-to-device (D2D) communication; and
in response to the terminal determining that the network device does not receive the data, or in response to the terminal determining that a peer end does not receive the data upon the D2D communication being performed, determining, by the terminal, transmit power for retransmitting the data, wherein the transmit power for retransmitting the data is a sum of transmit power used for last data sending and a preset amplitude value.

5. The method according to claim 4, wherein:
in response to the power information comprising the expected receive power of the network device, the determining, by the terminal based on the power configuration information, the transmit power used by the terminal to send the data comprises:
determining, by the terminal, expected receive power of the network device to which the data is sent, based on expected receive power of the network device corresponding to the priority of the data sent by the terminal; and
determining, by the terminal, the transmit power used by the terminal to send the data, based on the expected receive power of the network device to which the data is sent and a path loss value;
or
in response to the power information comprising the transmit power of the terminal used by the terminal to communicate with the network device, the determining, by the terminal based on the power configuration information, the transmit power used by the terminal to send the data comprises:

determining, by the terminal, the transmit power used by the terminal to send the data, based on transmit power of the terminal corresponding to the priority of the data sent by the terminal.

6. The method according to claim 4, wherein:
in response to the terminal status information comprising reference signal received power (RSRP) or reference signal received quality (RSRQ) of the network device measured by the terminal, and the power information comprises the expected receive power of the network device, the determining, by the terminal based on the power configuration information, the transmit power used by the terminal to send the data comprises:
determining, by the terminal, expected receive power of the network device to which the data is sent, based on expected receive power of the network device corresponding to the RSRP or RSRQ of the network device measured by the terminal; and
determining, by the terminal, the transmit power used by the terminal to send the data, based on the expected receive power of the network device to which the data is sent and a path loss value;
or
in response to the terminal status information comprising the RSRP or RSRQ of the network device measured by the terminal, and the power information comprises the transmit power of the terminal used by the terminal to communicate with the network device, the determining, by the terminal based on the power configuration information, the transmit power used by the terminal to send the data comprises:
determining, by the terminal, transmit power of the terminal corresponding to the RSRP or RSRQ of the network device measured by the terminal as the transmit power used by the terminal to send the data.

7. The method according to claim 4, wherein in response to the power information comprising the transmit power used by the terminal to perform the D2D communication, the terminal performs the D2D communication with a peer end, and the determining, by the terminal based on the power configuration information, the transmit power used by the terminal to send data comprises:
determining, by the terminal, the following as the transmit power used by the terminal to send the data:
transmit power that is used by the terminal to perform the D2D communication and that corresponds to the priority of the data sent by the terminal.

8. The method according to claim 4, further comprising:
receiving, by the terminal, a resource configuration message sent by the network device, wherein the resource configuration message comprises one of the following:
(a) a reference signal received power (RSRP) range of the terminal and a time-frequency resource configuration parameter,
(b) a reference signal received quality (RSRQ) range of the terminal and the time-frequency resource configuration parameter which comprises either (i) a physical resource block (PRB) parameter and a subframe parameter, or (ii) a PRB parameter and a system frame parameter; and
determining, by the terminal based on the resource configuration message, an uplink resource used by the terminal to send the data.

9. The method according to claim 4, further comprising:
sending, by the terminal to the network device, the priority of the data.

10. The method according to claim 1, further comprising:
receiving, by the network device, quality of service (QoS) information from a core network, so as to determine the priority of the data based on the QoS information.

11. A terminal comprising:
a non-transitory memory storing processor-executable instructions; and
a processor configured to execute the processor-executable instructions to perform operations comprising:
receiving power configuration information from a network device, wherein the power configuration information comprises a one-to-one correspondence between power information and terminal status information; and
determining based on the power configuration information, transmit power used by the terminal to send data;
wherein the terminal status information comprises a priority of the data sent by the terminal;
the power information comprises at least one of expected receive power of the network device, transmit power used by the terminal to communicate with the network device, and transmit power used by the terminal to perform device-to-device (D2D) communication; and
in response to the terminal determining that the network device does not receive the data, or in response to the terminal determining that the peer end does not receive the data when the D2D communication is performed, determining transmit power for retransmitting the data, wherein the transmit power for retransmitting the data is a sum of transmit power for last data sending and a preset amplitude value.

12. The terminal according to claim 11, wherein:
when the terminal status information comprises the priority of the data sent by the terminal, and the power information comprises the expected receive power of the network device, the determining based on the power configuration information, the transmit power used by the terminal to send the data comprises:
determining, expected receive power of the network device to which the data is sent, based on expected receive power of the network device corresponding to the priority of the data sent by the terminal; and
determining, the transmit power used by the terminal to send the data, based on the expected receive power of the network device to which the data is sent and a path loss value;
or
when the terminal status information comprises the priority of the data sent by the terminal, and the power information comprises the transmit power of the terminal used by the terminal to communicate with the network device, the determining based on the power configuration information, the transmit power used by the terminal to send the data comprises:
determining, the transmit power used by the terminal to send the data, based on transmit power of the terminal corresponding to the priority of the data sent by the terminal.

13. The terminal according to claim 11, wherein:
when the terminal status information comprises reference signal received power (RSRP) or reference signal received quality (RSRQ) of the network device measured by the terminal, and the power information comprises the expected receive power of the network device, the determining based on the power configuration information, the transmit power used by the terminal to send the data comprises:

determining, expected receive power of the network device to which the data is sent, based on expected receive power of the network device corresponding to the RSRP or RSRQ of the network device measured by the terminal; and determining, the transmit power used by the terminal to send the data, based on the expected receive power of the network device to which the data is sent and a path loss value;

or when the terminal status information comprises the RSRP or RSRQ of the network device measured by the terminal, and the power information comprises the transmit power of the terminal used by the terminal to communicate with the network device, the determining based on the power configuration information, the transmit power used by the terminal to send the data comprises:

determining transmit power of the terminal corresponding to the RSRP or RSRQ of the network device measured by the terminal as the transmit power used by the terminal to send the data.

14. The terminal according to claim 11, wherein:

in response to the power information comprising the transmit power used by the terminal to perform the D2D communication, the terminal performs the D2D communication with a peer end, and the determining based on the power configuration information, the transmit power used by the terminal to send the data comprises:

determining the following as the transmit power used by the terminal to send the data:

transmit power that is used by the terminal to perform the D2D communication and that corresponds to the priority of the data sent by the terminal.

15. The terminal according to claim 11, wherein the operations further comprises:

receiving a resource configuration message sent by the network device, wherein the resource configuration message comprises one of the following:

(a) a reference signal received power (RSRP) range of the terminal and a time-frequency resource configuration parameter, (b) a reference signal received quality (RSRQ) range of the terminal and the time-frequency resource configuration parameter which comprises either (i) a physical resource block (PRB) parameter and a subframe parameter, or (ii) a PRB parameter and a system frame parameter; and determining based on the resource configuration message, an uplink resource used by the terminal to send the data.

16. The terminal according to claim 11, wherein the operations further comprises:

sending to the network device, the priority of the data sent.

* * * * *